(12) United States Patent
Zhang et al.

(10) Patent No.: US 10,687,240 B2
(45) Date of Patent: Jun. 16, 2020

(54) METHOD, DEVICE, AND SYSTEM FOR INTER-FREQUENCY CELL MEASUREMENT

(71) Applicant: Huawei Technologies Co., Ltd., Shenzhen, Guangdong (CN)

(72) Inventors: Tao Zhang, Beijing (CN); Bo Lin, Beijing (CN); Li Chai, Beijing (CN); Jie Shi, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/037,735

(22) Filed: Jul. 17, 2018

(65) Prior Publication Data
US 2018/0324626 A1    Nov. 8, 2018

Related U.S. Application Data

(63) Continuation of application No. 14/335,329, filed on Jul. 18, 2014, now Pat. No. 10,039,024, which is a (Continued)

(30) Foreign Application Priority Data

Jan. 19, 2012 (CN) .......................... 2012 1 0018153

(51) Int. Cl.
*H04W 24/10* (2009.01)
*H04W 36/00* (2009.01)
(Continued)

(52) U.S. Cl.
CPC ....... *H04W 24/10* (2013.01); *H04W 36/0088* (2013.01); *H04W 24/08* (2013.01);
(Continued)

(58) Field of Classification Search
CPC . H04W 24/08; H04W 24/10; H04W 36/0088; H04W 36/04; H04W 36/00837; H04W 84/045; Y02D 70/00; Y02B 60/50
See application file for complete search history.

(56) References Cited

U.S. PATENT DOCUMENTS

2003/0117980 A1    6/2003  Kim et al.
2004/0022217 A1    2/2004  Korpela et al.
(Continued)

FOREIGN PATENT DOCUMENTS

CN    101043697 A    9/2007
CN    101043708 A    9/2007
(Continued)

OTHER PUBLICATIONS

3GPP TS 36.133 V10.5.0 (Dec. 2011), Technical Specification, 3rd Generation Partnership Project; Technical Specification Group Radio Access Network; Evolved Universal Terrestrial Radio Access (E-UTRA); Requirements for support of radio resource management (Release 10), Dec. 2011, 544 pages.
(Continued)

*Primary Examiner* — Jenee Holland
(74) *Attorney, Agent, or Firm* — Leydig, Voit & Mayer, Ltd.

(57) ABSTRACT

The present invention provides a method, a device, and a system for inter-frequency cell measurement. The method includes: performing, by a terminal, when receiving a measurement command of a network side device, inter-frequency cell measurement, in different cases, based on the time specified in different measurement time parameters or based on measurement time parameters corresponding to the information about an inter-frequency band. As different measurement time parameters specify different time actually used for measurement, not only an inter-frequency cell that meets a measurement event can be measured, but also the
(Continued)

time for measurement by the terminal can be reduced, thereby reducing the power consumption of the terminal and enhancing the performance of the terminal.

6 Claims, 13 Drawing Sheets

Related U.S. Application Data continuation of application No. PCT/CN2012/085526, filed on Nov. 29, 2012.

(51) Int. Cl.
*H04W 36/04* (2009.01)
*H04W 24/08* (2009.01)
*H04W 84/04* (2009.01)

(52) U.S. Cl.
CPC ...... *H04W 36/00837* (2018.08); *H04W 36/04* (2013.01); *H04W 84/045* (2013.01); *Y02D 70/00* (2018.01); *Y02D 70/142* (2018.01)

(56) References Cited

U.S. PATENT DOCUMENTS

| | | |
|---|---|---|
| 2004/0116110 A1 | 6/2004 | Amerga et al. |
| 2004/0121777 A1* | 6/2004 | Schwarz ............... H04W 36/22 455/452.1 |
| 2005/0032520 A1 | 2/2005 | Muller |
| 2005/0277415 A1 | 12/2005 | Hamalainen et al. |
| 2006/0199544 A1 | 9/2006 | Ramakrishna et al. |
| 2006/0223557 A1 | 10/2006 | Manohar |
| 2007/0070939 A1 | 3/2007 | Hottinen |
| 2007/0099615 A1 | 5/2007 | Farnsworth et al. |
| 2008/0039094 A1 | 2/2008 | Jeong et al. |
| 2008/0123570 A1 | 5/2008 | Yin |
| 2008/0220778 A1 | 9/2008 | Ekstedt et al. |
| 2008/0220784 A1 | 9/2008 | Samasundaram et al. |
| 2008/0247375 A1 | 10/2008 | Muharemovic et al. |
| 2008/0254803 A1 | 10/2008 | Zalio |
| 2008/0287127 A1* | 11/2008 | Wu ................... H04W 72/1231 455/434 |
| 2009/0061847 A1 | 3/2009 | Roberts |
| 2009/0092056 A1 | 4/2009 | Kitazoe |
| 2009/0196197 A1 | 8/2009 | DiGirolamo et al. |
| 2009/0209256 A1 | 8/2009 | Nakashima et al. |
| 2009/0274086 A1 | 11/2009 | Petrovic et al. |
| 2010/0113009 A1 | 5/2010 | Jeong et al. |
| 2010/0159950 A1 | 6/2010 | Toh et al. |
| 2010/0226264 A1 | 9/2010 | Axmon et al. |
| 2010/0265918 A1 | 10/2010 | Marinier et al. |
| 2010/0296410 A1 | 11/2010 | Kazmi et al. |
| 2010/0330992 A1* | 12/2010 | Bhattacharjee ..... H04W 52/028 455/436 |
| 2010/0331019 A1 | 12/2010 | Bhattacharjee et al. |
| 2011/0177815 A1 | 7/2011 | Jeong et al. |
| 2011/0188396 A1 | 8/2011 | Jung et al. |
| 2011/0242999 A1 | 10/2011 | Palanki et al. |
| 2011/0243028 A1* | 10/2011 | Ushirokawa .......... H04W 24/10 370/252 |
| 2012/0076041 A1 | 3/2012 | Jung et al. |
| 2012/0231782 A1 | 9/2012 | Hellander et al. |
| 2012/0322440 A1 | 12/2012 | Jeong et al. |
| 2013/0010831 A1 | 1/2013 | Jung et al. |
| 2013/0155881 A1* | 6/2013 | Amerga ................. H04W 4/06 370/252 |
| 2014/0029570 A1 | 1/2014 | Lee et al. |

FOREIGN PATENT DOCUMENTS

| | | |
|---|---|---|
| CN | 101043713 A | 9/2007 |
| CN | 101360334 A | 2/2009 |
| CN | 101635934 A | 1/2010 |
| CN | 101808358 A | 8/2010 |
| JP | 2008535445 A | 8/2008 |
| JP | 2009268142 A | 11/2009 |
| JP | 2010521091 | 6/2010 |
| WO | 01/52585 A1 | 7/2001 |
| WO | 2007/132861 A1 | 11/2007 |
| WO | 2008/022591 A1 | 2/2008 |

OTHER PUBLICATIONS

3GPP TS 36.331 V10.4.0 (Dec. 2011), Technical Specification, 3rd Generation Partnership Project; Technical Specification Group Radio Access Network; Evolved Universal Terrestrial Radio Access (E-UTRA); Radio Resource Control (RRC); Protocol specification (Release 10), Dec. 2011, 296 pages.

"Considerations on measurement performance without measurement gaps", Renesas Mobile Europe Ltd., 3GPP TSG-RAN WG4 Meeting #61, Nov. 14-18, 2011, 4 pages, R4-115963.

"Inter-frequency Pico cell measurements for Hetnet deployments", NTT Docomo, Inc., 3GPP TSG-RAN WG2 #76, Nov. 14-18, 2011, 4 pages.

"Small cell detection in HetNet environment", Nokia Siemens Networks, Nokia Corporation, 3GPP TSG-RAN WG2 Meeting #76, Nov. 14-18, 2011, 8 pages.

"Efficient small cell detection background search", Nokia Siemens Networks, Nokia Corporation. 3GPP TSG-RAN WG2 Meeting #77bis, Mar. 26-30, 2012, 5 pages.

* cited by examiner

METHOD, DEVICE, AND SYSTEM FOR INTER-FREQUENCY CELL MEASUREMENT

CROSS-REFERENCE TO RELATED APPLICATION

This application is a continuation U.S. patent application Ser. No. 14/335,329, filed on Jul. 18, 2014, which is a continuation of International Application No. PCT/CN2012/085526, filed on Nov. 29, 2012. The International Application claims priority to Chinese Patent Application No. 201210018153.X, filed on Jan. 19, 2012. All of the aforementioned patent applications are incorporated herein by reference in their entireties.

TECHNICAL FIELD

The present invention relates to the technical field of wireless communications, and in particular, to a method, a device, and a system for inter-frequency cell measurement.

BACKGROUND

With the rapid development of communications technologies, the future development trend of communications networks is that a variety of wireless communications networks coexist and develop, and therefore heterogeneous network deployment is gradually introduced in a wireless network.

In heterogeneous network deployment, network coverage is formed by cells of different sizes and types, such as macrocells, small cells, and microcells. A macrocell has a large and continuous coverage area, and seamless coverage is formed between macrocells. Within the coverage of a macrocell, several low-power nodes, such as a small base station, a home base station, a relay station and a wireless local area network access point, are usually deployed. Because these low-power nodes have small wireless coverage areas, they are referred to small cells; that is, the coverage of a macrocell includes the coverage of a plurality of small cells, and in heterogeneous network deployment, small cells are scattered in a macrocell. By means of the structure of heterogeneous network deployment, the network traffic volume is large; for example, the traffic is heavy, and, when a macrocell is under heavy network load, a network service can be distributed by switching a terminal to a corresponding small cell, thereby increasing the network capacity.

During heterogeneous network deployment, according to different demands of carriers, a macrocell and a small cell can be set to different frequencies, and the small cell is an inter-frequency cell for the macrocell. In such an inter-frequency deployment, a network side device of the macrocell, when needing to switch a terminal to an inter-frequency cell at a band, needs to trigger the terminal to perform inter-frequency cell measurement, and the terminal, when determining that a signal of the inter-frequency cell meets a specific measurement event, reports the inter-frequency cell to the network side device, making it easy for the network side device to perform cell handover.

When a terminal performs inter-frequency cell measurement, neither data nor signaling is transmitted between the terminal and a network side device, and a measurement process usually takes a long time. Therefore, to prevent influences on normal communications services, the terminal usually performs inter-frequency cell measurement in a discontinuous measurement manner, that is, a gap mode measurement manner, in which a cell signal is measured only within a measurement gap period and normal communications can be performed outside the gap period. Both the network side device and the terminal need to work based on the gap mode to ensure time synchronization.

In an existing method for inter-frequency cell measurement, a network side device determines relevant measurement time parameters of a gap mode, including a gap duration, a gap repetition cycle, a minimum available measurement time, and the like. The relevant measurement time parameters of the measurement gap mode are usually fixed numerical values. For example, the gap duration is 6 ms, the gap repetition cycle is 40 ms, and it is specified that the minimum available measurement time within a certain time is not lower than 60 ms, and the like. Next, the network side device requests that the terminal performs measurement for an inter-frequency cell at a band and sends the relevant measurement time parameters of the gap mode to the terminal. The terminal is then capable of performing, based on the time specifications of the relevant measurement time parameters of the gap mode, measurement on the cell only within the measurement gap period, so as to monitor whether a signal of the inter-frequency cell meets a measurement event, and reports the inter-frequency cell that meets the measurement event to the network side device.

However, it is a continuous process for a terminal to perform inter-frequency cell measurement, and the process stops when a measurement termination instruction from the network side device is received. During the implementation of the present invention, the inventor finds that the prior art at least has the following problem: in heterogeneous network deployment, because of the deployment position relationship of inter-frequency cells and the relationship of different bands where the cells are located, if measurement is performed based on general gap mode measurement time parameters, any inter-frequency cell that meets a measurement event might fail to be measured, and a terminal might perform measurement continuously without receiving a measurement termination instruction, which causes a waste of measurement time and accordingly increases the power consumption of the terminal.

SUMMARY

In view of this, the present invention provides a method, a device, and a system for inter-frequency cell measurement, which solve the technical problem of a waste in the power consumption of a terminal for performing inter-frequency cell measurement.

To achieve the preceding objective, the present invention provides multiple solutions including the following technical solution:

According to an aspect of the present invention, a method for inter-frequency cell measurement is provided, including:

detecting whether the signal quality or strength of a serving cell is lower than a second preset value, where the second preset value is carried in a measurement command or prestored in a terminal;

if yes, performing, based on preset first measurement time parameters, inter-frequency cell measurement; and if no, performing, based on preset second measurement time parameters, inter-frequency cell measurement, where the first measurement time parameters include a first gap duration, a first gap repetition cycle, and a first minimum available measurement time, the second measurement time parameters include a second gap duration, a second gap repetition cycle, and a second minimum available measurement time, and the first gap duration is longer than the second gap duration, and/or the first gap repetition cycle is shorter than the second gap repetition cycle, and/or the first minimum available measurement time is longer than the second minimum available measurement time.

As can be seen from the aforementioned technical solutions, compared with the prior art, the present invention provides a method, a device, and a system for inter-frequency cell measurement, in which a network side device sends to a terminal a measurement command carrying information about an inter-frequency band, and the terminal performs, when receiving the measurement command of the network side device, inter-frequency cell measurement, in different cases, based on the time specified in different measurement time parameters or based on measurement time parameters corresponding to the information about the inter-frequency band. As different measurement time parameters specify different time used for measurement, not only an inter-frequency cell that meets a measurement event can be measured, but also the time for measurement by the terminal can be reduced, thereby reducing the power consumption of the terminal and enhancing the performance of the terminal.

BRIEF DESCRIPTION OF THE DRAWINGS

To illustrate the technical solutions according to the embodiments of the present invention or in the prior art more clearly, the following briefly introduces accompanying drawings required for describing the embodiments or the prior art. Apparently, the accompanying drawings in the following descriptions merely show some of the embodiments of the present invention, and persons of ordinary skill in the art can obtain other drawings according to the accompanying drawings without creative efforts.

DETAILED DESCRIPTION

The technical solutions of the present invention will be clearly described in the following with reference to the accompanying drawings. It is obvious that the embodiments to be described are only a part rather than all of the embodiments of the present invention. All other embodiments obtained by persons of ordinary skill in the art based on the embodiments of the present invention without creative efforts shall fall within the protection scope of the present invention.

One of the main ideas of the present invention may include that: A network side device sends to a terminal a measurement command carrying information about an inter-frequency band, and the terminal may perform, when receiving the measurement command of the network side device, inter-frequency cell measurement, according to different application cases, based on different measurement time parameters or based on measurement time parameters corresponding to the information about an inter-frequency band. Therefore, not only an inter-frequency cell whose signal meets a measurement event can be measured, but also the electrical consumption for measurement of a terminal can be reduced, thereby enhancing the performance of the terminal.

Figure 1:
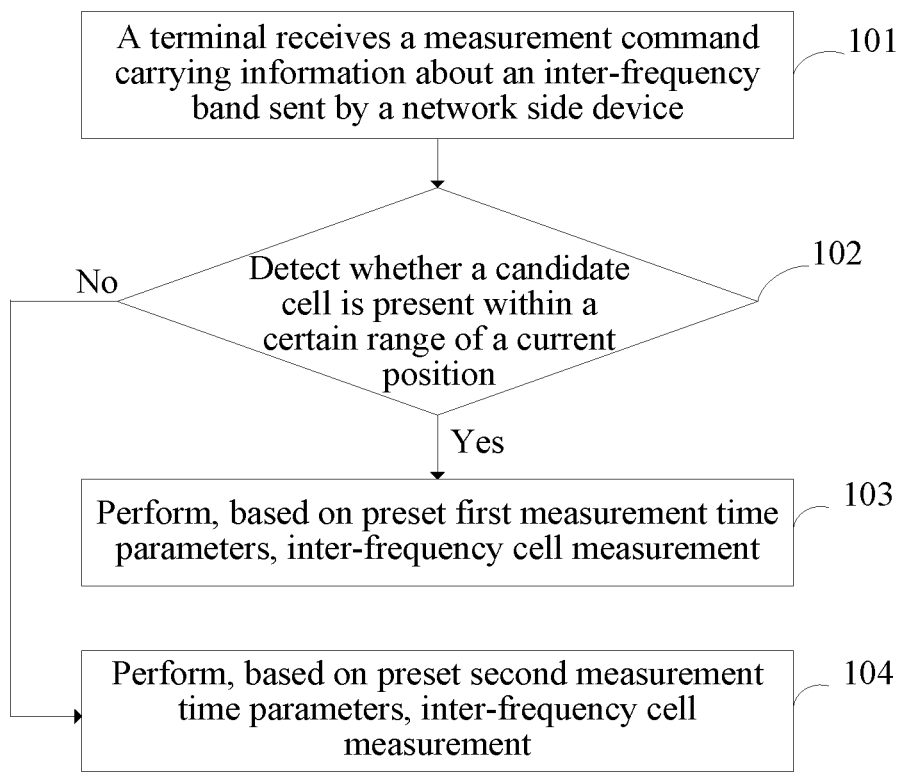
FIG. 1 is a flow chart of a method for inter-frequency cell measurement according to Embodiment 1 of the present invention.

FIG. 1 is a flow chart of a method for inter-frequency cell measurement according to Embodiment 1 of the present invention, in which the method may include:

Step 101. A terminal receives a measurement command carrying information about an inter-frequency band sent by a network side device.

In this embodiment, a serving cell of a terminal may refer to a macrocell; small cells scattered within the coverage of the macrocell are inter-frequency cells having different carrier frequencies from that of the macrocell; and the network side device may refer to equipment that is capable of performing data and signaling transmission with a terminal, such as abase station, a relay station, a base station controller, and a wireless local area network access point, and controls a serving cell of the terminal.

Of course, a serving cell of a terminal in the present invention may refer to a small cell, the coverage of the small cell includes a microcell, that is, an inter-frequency cell whose carrier frequency is different from that of the small cell.

When a network side device monitors that the network traffic volume of a serving cell is large, or when the effect of an inter-frequency cell in increasing system capacity is to be enhanced, in order to select a suitable inter-frequency cell to distribute a network service, the network side device commands the terminal to perform inter-frequency cell measurement and sends a measurement command to the terminal.

The measurement command includes information about an inter-frequency band, for example, the frequency of a cell to be measured, so that the terminal is capable of easily determining, according to the information about the inter-frequency band, an inter-frequency cell that is located at the band and performing measurement.

Step 102. Detect whether a candidate cell is present within a certain range of a current position. If yes, the process turns to step 103; and if no, the process turns to step 104.

The current position refers to the current position of the terminal in the serving cell, the candidate cell may include an inter-frequency cell in a band that requires to be measured currently and is a candidate cell distinguished from the serving cell of the terminal.

Various manners may be adopted to detect whether a candidate cell is present within a certain range of a current position. For example, it may be determined whether a candidate cell is present by a satellite positioning system acquiring whether a network element device is present in a certain range of the position of the terminal, or may be determined whether a candidate cell is present within a certain range of the terminal according to the quality or strength of the received signal. The specific implementation manners are introduced in detail in the following embodiments.

Step 103. Perform, based on preset first measurement time parameters, inter-frequency cell measurement.

The measurement time parameters refer to relevant measurement time parameters of a gap mode, and a gap refers to a period that can be actually used for measurement when the terminal performs inter-frequency cell signal measurement.

The measurement time parameters may include a gap duration, that is, an available time in each time of measurement; a gap repetition cycle, that is, an interval time between gaps; and a minimum available measurement time, in which the sum of time for actual measurement within a certain time range should not be smaller than the minimum available measurement time, so as to limit the actual time that the terminal performs measurement within the certain time, so that the inter-frequency cell measurement is capable of meeting a certain demand. For example, the gap duration is 6 ms (milliseconds), the gap repetition cycle is 80 ms, and the minimum available time within 480 ms is 30 ms; that is to say, the terminal may perform signal measurement once every 80 ms, each time of measurement takes 6 ms, and the minimum available time specifies that the terminal at least performs measurement (30 ms/6 ms)=5 times within every 480 ms.

The terminal needs to perform inter-frequency cell measurement strictly based on the measurement time parameters, and at the same time the network side device also needs to work strictly based on the measurement time parameters, so as to guarantee that during the measurement in the gap, the terminal and the network side device do not exchange data and signaling.

As an inter-frequency cell requires to be measured, the terminal first needs to determine an inter-frequency cell. Specifically, the terminal adjusts the receiving frequency thereof to the inter-frequency band and then performs a search to find a cell at the inter-frequency band. Next, the terminal performs inter-frequency cell signal measurement respectively, and reports, when measuring that the signal of an inter-frequency cell meets a specific measurement event, the cell identifier of the inter-frequency cell to the network side device, in which the measurement event may specifically refer to a condition to be met by a signal of a cell that can be reported to the network side device. For example, the measurement event may refer to that the signal quality or strength is greater than a threshold value and keeps so for a certain time. According to different network demands, the measurement event may also be different. The specific measurement process is the same as that in the prior art, so no further details are provided here.

As for inter-frequency cell signal measurement based on the first measurement time parameters, inter-frequency cell signal measurement is performed based on the first gap duration, the first gap repetition cycle, and the specification of the first minimum available measurement time.

Alternatively, when the terminal performs, based on the first measurement time parameters, inter-frequency cell measurement, the terminal first needs to perform a search to determine which inter-frequency cells are present, and the search takes a certain time. Therefore, the terminal may monitor, when performing the cell search, whether a search time exceeds a preset time, and may switch, if the terminal fails to find any cell on the inter-frequency band within a preset time, the currently adopted measurement time parameters, and continue the measurement based on the time specifications of other measurement time parameters, for example, may perform the operation in step 104, so as to reduce the power consumption of the terminal.

Step 104. Perform, based on preset second measurement time parameters, inter-frequency cell measurement.

According to the instructions of the aforementioned measurement time parameters, when a gap duration is longer, or a gap repetition cycle is shorter, or a minimum available time is longer, the timer is longer for the terminal to perform inter-frequency cell measurement within a certain time range, and therefore the probability that the terminal determines a cell that meets a measurement event within a certain period is increased; however, the electrical consumption for measurement of a terminal may be increased at the same time. Oppositely, the time for the terminal to perform inter-frequency cell measurement is shorter within a certain time range, and the probability that terminal determines a cell that meets a measurement event is correspondingly reduced; however, the electrical consumption for measurement of a terminal may be reduced.

In this embodiment, the first gap duration in the first measurement time parameters is longer than the second gap duration in the second measurement time parameters, and/or the first gap repetition cycle is shorter than the second gap repetition cycle, and/or the first minimum available measurement time is longer than the second minimum available measurement time. That is to say, compared with the inter-frequency cell signal measurement based on the second measurement time parameters, the inter-frequency cell signal measurement based on the first measurement time parameters provides a longer actual time for inter-frequency cell measurement within a certain period, so that an inter-frequency cell that satisfies a measurement requirement can be selected more quickly.

When it is determined that a candidate cell is present within a certain range of the position of the terminal, it indicates that a cell at an inter-frequency band might be present in the periphery of the position of the terminal, so that the terminal starts, based on the time specifications of the first measurement time parameters, the process of inter-frequency cell signal measurement, so as to determine an inter-frequency cell that meets a measurement event more quickly.

If it is determined that a candidate cell is not present within a certain range of the position of the terminal, in indicates that a cell at an inter-frequency band might be not present in the periphery of the position of the terminal, so that the terminal may start, based on the time specifications of the second measurement time parameters, the process of inter-frequency cell signal measurement, so as to reduce the electrical consumption for measurement of a terminal.

As the measurement time parameters specify a gap duration, a gap repetition cycle, and the like of measurement, within one measurement gap, due to the time limits, the terminal might be unable to complete all measurement operations including searching for all inter-frequency cells and measuring an inter-frequency cell that meets a measurement event, so that the terminal saves, when the measurement gap period ends, the current measurement relevant information, so as to continue measurement in a next measurement gap according to the measurement relevant information of the last time. Within each measurement gap period, the terminal needs to adjust a receiving frequency into the inter-frequency band and then adjusts, when the measurement gap period ends, the receiving frequency back to the carrier frequency of the serving cell.

In another embodiment, as discussed in step 103, the terminal needs to perform, during inter-frequency cell measurement based on first measurement time parameters, a cell search, and if a search time exceeds a preset time, it indicates that an inter-frequency cell is actually not present within a certain range of the terminal, and the terminal may continue to perform, based on the second measurement time parameters, inter-frequency cell measurement, so as to reduce the electrical consumption for measurement.

The first measurement time parameters and/or second measurement time parameters may be carried in the measurement command. That is, the network side device sends configured first measurement time parameters and/or second measurement time parameters to the terminal to request the terminal to perform measurement on a cell at an inter-frequency band.

Alternatively, the terminal needs to feed back, when performing inter-frequency cell measurement based on measurement time parameters, to the network side device identifiers of measurement time parameters to be adopted and/or an application moment of the measurement time parameters. The identifiers of measurement time parameters are used for distinguishing different measurement time parameters, and are carried in the measurement time parameters. The network side device controls, after receiving the identifiers of the measurement time parameters and/or the application moment of the measurement time parameters to be adopted by the terminal, at the application moment of the measurement time parameters, based on the time specified in the corresponding measurement time parameters, sending of data and signaling.

Specifically, the network side device may determine, according to the application moment of the measurement time parameters fed back by the terminal, that is, a specific moment that the terminal performs measurement based on measurement time parameters or a specific moment of switching when measurement time parameters need to be switched, when to control the sending of data and signaling based on the time specified by the measurement time parameters.

Furthermore, the network side device determines, after receiving the identifiers of measurement time parameters, based on information about an appointment with the terminal, the application moment of the measurement time parameters corresponding to the identifiers of measurement time parameters.

The first measurement time parameters and/or the second measurement time parameters may be further saved in the network side device and the terminal, so that the terminal may measure, after receiving a measurement command, based on the first measurement time parameters and/or the second measurement time parameters, a cell at an inter-frequency band.

Alternatively, the terminal feeds back, when performing measurement based on measurement time parameters, to the network side device identifiers of the measurement time parameters to be adopted and/or an application moment of the measurement time parameters.

Of course, the first measurement time parameters and/or second measurement time parameters may be further configured and saved by the terminal, so that the terminal performs, after receiving a measurement command, based on the first measurement time parameters and/or second measurement time parameters, inter-frequency cell measurement. During the inter-frequency cell measurement, current measurement information further needs to be fed back to the network side device. The measurement information may include the currently adopted measurement time parameters, that is, the first measurement time parameters and/or second measurement time parameters, and may further include an application moment of the measurement time parameters. Therefore, the network side device may control, according to the current measurement time parameters, the operations of data and signaling transmission with the terminal.

When the first measurement time parameters and/or the second measurement time parameters are prestored in the terminal, the terminal first determines, after receiving the measurement command, whether a measurement identifier is carried in the measurement command. If yes, the terminal then performs the operations in step 102 to step 104; and if no, it performs measurement based on a conventional manner.

In this embodiment, a terminal first determines, after receiving a measurement command from a network side device, whether a candidate cell is present in the periphery of the position thereof, when present, performs, based on first measurement time parameters, inter-frequency cell signal measurement, so as to determine more quickly an inter-frequency cell that meets a measurement event; when a candidate cell is not present in the periphery of the terminal, performs, based on second measurement time parameters, inter-frequency cell signal measurement, so as to reduce the measurement time, and lower the power consumption of the terminal. As it is determined that a candidate cell is not present in the periphery of the position of the terminal, it indicates that the terminal is away from all inter-frequency cells by a long distance, so that the signal measurement is performed based on second measurement time parameters that are more power saving, so as to lower the power consumption for measurement of a terminal, thereby enhancing the performance of the terminal.

Figure 2:
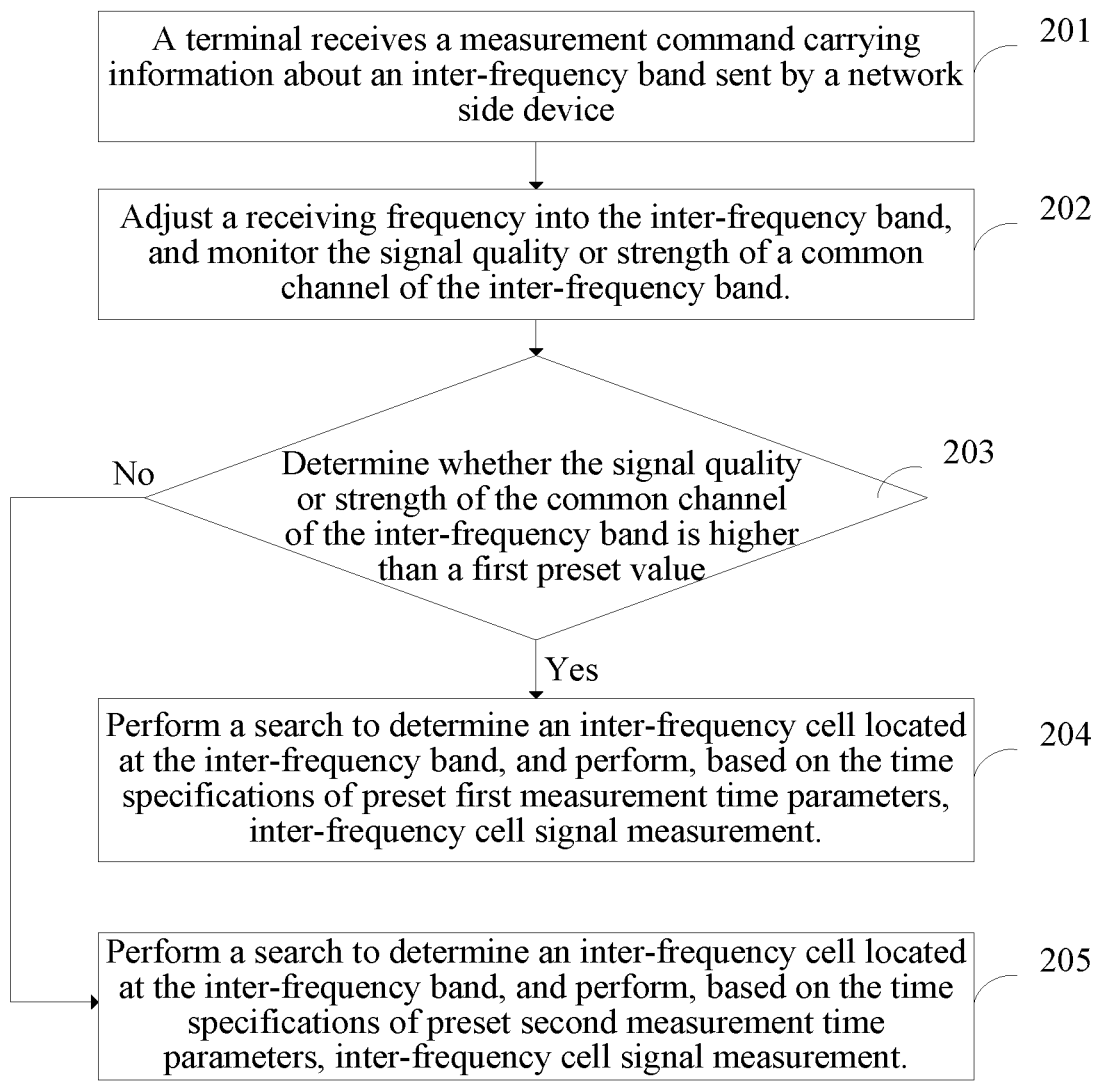
FIG. 2 is a flow chart of a method for inter-frequency cell measurement according to Embodiment 2 of the present invention.

FIG. 2 is a flow chart of a method for inter-frequency cell measurement according to Embodiment 2 of the present invention, in which the method may include:

Step 201. A terminal receives a measurement command carrying information about an inter-frequency band sent by a network side device.

This step is similar with that in Embodiment 1, so no further details are provided here.

Step 202. Adjust a receiving frequency into the inter-frequency band, and monitor the signal quality or strength of a common channel of the inter-frequency band.

After receiving a measurement command, the terminal may prepare to enter a discontinuous measurement stage. Before performing measurement based on the period specified in measurement time parameters, the terminal may first adjust the receiving frequency thereof into the inter-frequency band to monitor the signal quality or strength of the common channel of the inter-frequency band. The common channel refers to a downlink common signal transmission channel of all inter-frequency cells at the inter-frequency band, such as, a PSCH (Primary Synchronization Channel) and/or an SSCH (secondary synchronization channel). That is to say, a terminal may measure the signal strength or quality of one common channel, and may also measure the signal strength or quality of a plurality of common signals.

The terminal scans, after the adjustment to the inter-frequency band, a common channel; that is, it monitors a signal of a common channel.

Step 203. Determine whether the signal quality or strength of the common channel of the inter-frequency band is higher than a first preset value. If yes, the process turns to step 204; and if no, the process turns to step 205.

The first preset value may be carried in the measurement command, or of course may also be preset and stored in the terminal.

In this embodiment, it is determined, according to whether the signal quality or strength of a common channel of an inter-frequency band is higher than a first preset value, whether a candidate cell is present within a certain range of a current position of a terminal. When the signal quality or strength of the common channel is greater than the first preset value, it indicates that the signal transmitted on the common channel is stronger, and it may therefore be determined that a candidate cell is present within the certain range of the terminal. When the signal quality or strength of the common channel is lower than or equal to the first preset value, it indicates that the signal transmitted on the common channel is weaker, and it may therefore be determined that a candidate cell is not present within the certain range of the terminal.

The first preset value is set according to an actual situation; for example, it is set according to the signal quality or strength of the common channel when a preset number of cells are present within the certain range of the terminal.

In this embodiment, as it is determined whether a candidate cell is present within a certain range of a terminal through the monitored signal quality or strength of a common channel of an inter-frequency band, the candidate cell is an inter-frequency cell located at the inter-frequency band.

Step 204. Perform a search to determine an inter-frequency cell located at the inter-frequency band, and perform, based on the time specifications of preset first measurement time parameters, inter-frequency cell signal measurement.

After the receiving frequency is adjusted into the inter-frequency band, a search needs to be performed to determine an inter-frequency cell located at the inter-frequency band. The inter-frequency cell signal measurement on the preset first measurement time parameters is the inter-frequency cell signal measurement on the time specifications of a measurement gap duration, a gap repetition cycle, and a minimum available measurement time.

Step 205. Perform a search to determine an inter-frequency cell located at the inter-frequency band, and perform, based on the time specifications of preset second measurement time parameters, inter-frequency cell signal measurement.

The first gap duration in the first measurement time parameters is longer than the second gap duration in the second measurement time parameters, and/or the first gap repetition cycle is shorter than the second gap repetition cycle, and/or the first minimum available measurement time is longer than the second minimum available measurement time. That is to say, compared with the inter-frequency cell signal measurement on the second measurement time parameters, the inter-frequency cell signal measurement on the first measurement time parameters provides a longer time for inter-frequency cell measurement, so that an inter-frequency cell that satisfies a measurement requirement can be selected more quickly.

The first measurement time parameters and/or second measurement time parameters may be carried in the measurement command. That is, the network side device sends configured first measurement time parameters and/or second measurement time parameters to the terminal to request the terminal to perform measurement on a cell at an inter-frequency band.

Alternatively, the terminal needs to feed back, when performing inter-frequency cell measurement based on measurement time parameters, to the network side device identifiers of measurement time parameters to be adopted and/or an application moment of the measurement time parameters. The identifiers of measurement time parameters are used for distinguishing different measurement time parameters, and are carried in the measurement time parameters. The network side device may control, after receiving the identifiers of the measurement time parameters and/or the application moment of the measurement time parameters, at the application moment of the measurement time parameters, based on the time specified in the corresponding measurement time parameters, sending of data and signaling.

Specifically, the network side device may determine, according to the application moment of the measurement time parameters fed back by the terminal, that is, a specific moment that the terminal performs measurement based on measurement time parameters or a specific moment of switching when measurement time parameters need to be switched, when to control the sending of data and signaling based on the time specified by the measurement time parameters.

Furthermore, the network side device determines, after receiving the identifiers of measurement time parameters, based on information about an appointment with the terminal, the application moment of the measurement time parameters corresponding to the identifiers of measurement time parameters.

The first measurement time parameters and/or the second measurement time parameters may be further saved in the network side device and the terminal, so that the terminal may measure, after receiving a measurement command, based on the first measurement time parameters and/or the second measurement time parameters, a cell at an inter-frequency band.

The first measurement time parameters and/or second measurement time parameters may be further configured and saved by the terminal, so that the terminal performs, after receiving a measurement command, based on the first measurement time parameters and/or second measurement time parameters, inter-frequency cell measurement. During the inter-frequency cell measurement, current measurement information further needs to be fed back to the network side device. The measurement information may include the currently adopted measurement time parameters, that is, the first measurement time parameters and/or second measurement time parameters, and may further include an application moment of the measurement time parameters. Therefore, the network side device may control, according to the current measurement time parameters, the operations of data and signaling transmission with the terminal.

When the first measurement time parameters and/or the second measurement time parameters are stored by the terminal, the terminal first determines, after receiving the measurement command, whether a measurement identifier is carried in the measurement command. If yes, the terminal then performs the operations in step 202 to step 205; and if no, it performs, based on a conventional manner, inter-frequency cell measurement, and performs inter-frequency cell measurement by using general measurement time parameters.

The operations in step 204 and step 205 are operations triggered according to the determination result in step 203, in which different measurement time parameters are adopted. Therefore, by performing the operation in step 204, the actual measurement time may be increased, so that when it is determined that a candidate cell is present within a certain range of the position of the terminal, an inter-frequency cell that meets a measurement event can be determined more quickly. By performing the operation in step 205, the actual measurement time is reduced, so that when a candidate cell is not present within the certain range of the terminal, it may be regarded that the terminal currently might fail to measure any inter-frequency cell that meets a measurement event. Therefore, by performing the operation in step 205, the electrical consumption of the terminal may be reduced, thereby lowering the power consumption of the terminal.

In this embodiment, a terminal measures whether the signal quality or strength of a common channel of an inter-frequency band is higher than a first preset value to determine whether a cell is present within a certain range of the terminal, if yes, performs, based on the time specified in the first measurement time parameters, inter-frequency cell signal measurement, and if no, performs, based on the time specified in the second measurement time parameters, inter-frequency cell signal measurement, so as to measure and determine an inter-frequency cell that meets a measurement event more quickly, and at the same time reduce the time for measurement by the terminal, thereby reducing the power consumption of the terminal and enhancing the performance of the terminal.

Figure 3:
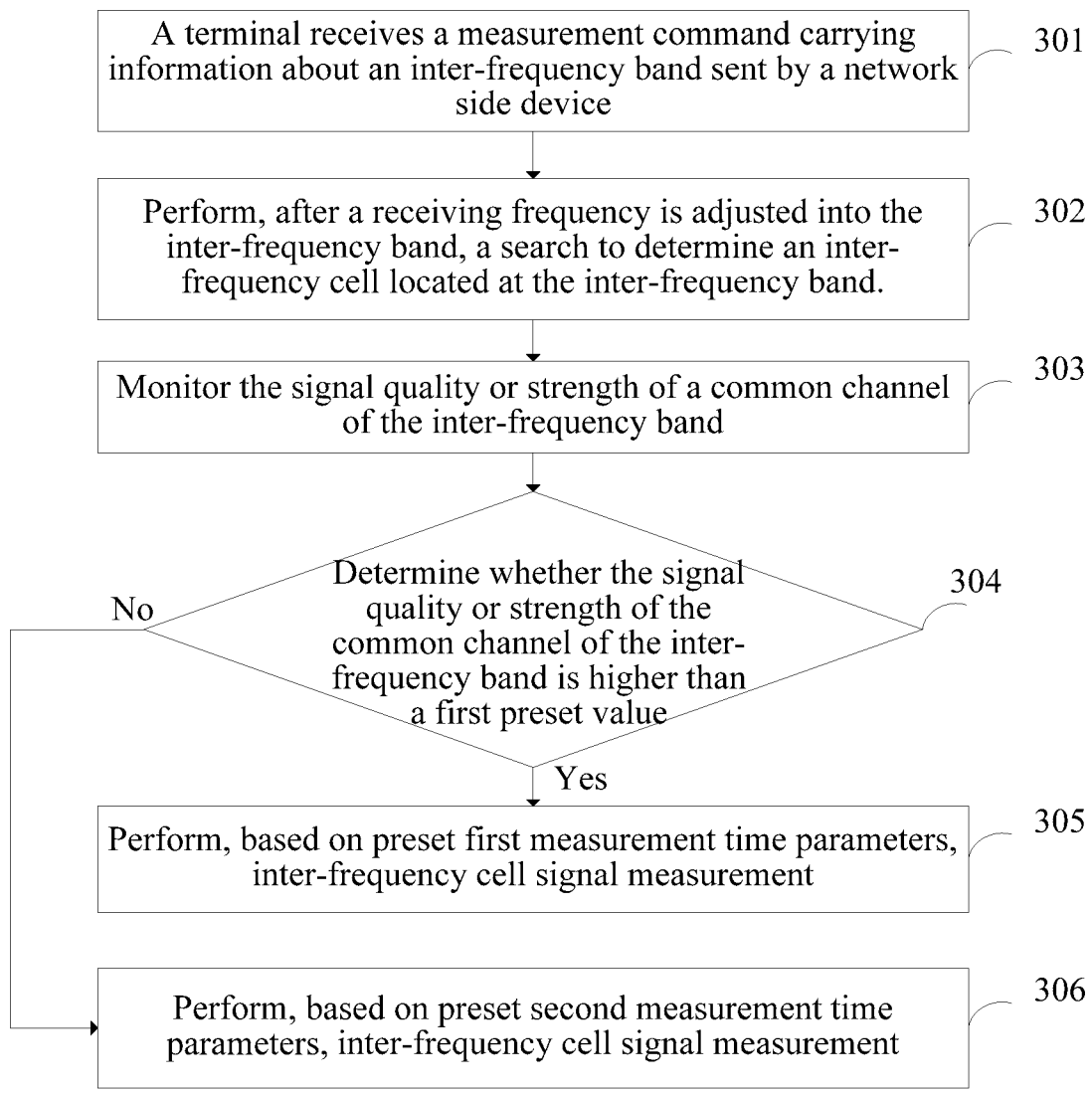
FIG. 3 is a flow chart of a method for inter-frequency cell measurement according to Embodiment 3 of the present invention.

FIG. 3 is a flow chart of a method for inter-frequency cell signal measurement according to Embodiment 3 of the present invention, in which the method may include:

Step 301. A terminal receives a measurement command carrying information about an inter-frequency band sent by a network side device.

Step 302. Perform, after a receiving frequency is adjusted into the inter-frequency band, a search to determine an inter-frequency cell located at the inter-frequency band.

The difference between this embodiment and Embodiment 2 lies in that, the terminal may first perform, after the receiving frequency is adjusted into the inter-frequency band, a search to first determine an inter-frequency cell located at the inter-frequency band. Reference should be made between the embodiments for other points.

Step 303. Monitor the signal quality or strength of a common channel of the inter-frequency band.

Step 304. Determine whether the signal quality or strength of the common channel of the inter-frequency band is higher than a first preset value. If yes, the process turns to step 305; and if no, the process turns to step 306.

Step 305. Perform, based on time specifications of preset first measurement time parameters, inter-frequency cell signal measurement.

Step 306. Perform, based on time specifications of preset second measurement time parameters, inter-frequency cell signal measurement.

In this embodiment, a terminal monitors whether the signal quality or strength of a common channel of an inter-frequency band is higher than a first preset value to determine whether a cell is present within a certain range of the terminal, if yes, performs, based on the time specified in the first measurement time parameters, inter-frequency cell measurement, and if no, performs, based on the time specified in the second measurement time parameters, inter-frequency cell signal measurement, so as to guarantee that an inter-frequency cell that meets a measurement event can be measured and determined and at the same time the time for measurement by the terminal is reduced, thereby reducing the power consumption of the terminal and enhancing the performance of the terminal.

Figure 4:
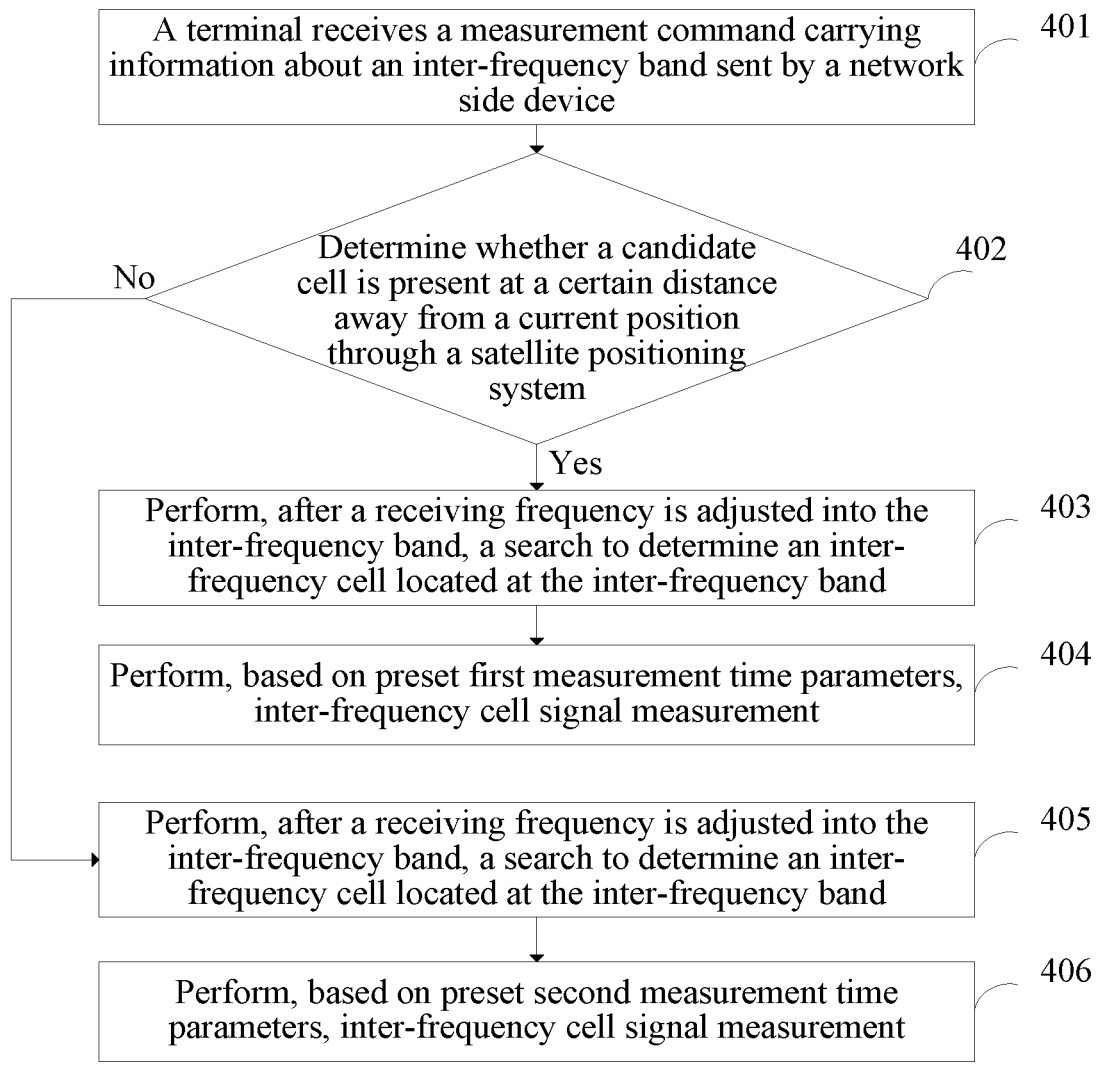
FIG. 4 is a flow chart of a method for inter-frequency cell measurement according to Embodiment 4 of the present invention.

FIG. 4 is a flow chart of a method for inter-frequency measurement according to Embodiment 4 of the present invention, in which the method may include:

Step 401. A terminal receives a measurement command carrying information about an inter-frequency band sent by a network side device.

Step 402. Determine whether a candidate cell is present at a certain distance away from a current position through a satellite positioning system. If yes, the process turns to step 403; and if no, the process turns to step 405.

In this step, it is determined whether a candidate cell is present within a certain distance away from the current position of the terminal through a satellite positioning system; that is, it is determined whether a candidate cell is present in the periphery of the terminal through a satellite positioning system.

As for that it is determined whether a candidate cell is present at a certain distance away from a current position through a satellite positioning system, specifically, the terminal acquires the position information of a network element within a certain range of the terminal through a satellite positioning system, determines whether other network elements are present in the periphery of the terminal, and if present, determines that a candidate cell is present in the periphery of the terminal.

Step 403. Perform, after a receiving frequency is adjusted into the inter-frequency band, a search to determine an inter-frequency cell located at the inter-frequency band, and the process turns to step 404.

Step 404. Perform, based on time specifications of preset first measurement time parameters, inter-frequency cell signal measurement.

Step 405. Perform, after a receiving frequency is adjusted into the inter-frequency band, a search to determine an inter-frequency cell located at the inter-frequency band, and the process turns to step 406.

Step 406. Perform, based on time specifications of preset second measurement time parameters, inter-frequency cell signal measurement.

In this embodiment, it is determined whether a cell is present within a certain range of the terminal through a satellite positioning system, if yes, after an inter-frequency cell is determined, inter-frequency cell signal measurement is performed based on the time specified in first measurement time parameters, and if no, after an inter-frequency cell is determined, inter-frequency cell signal measurement is performed based on the time specified in second measurement time parameters, so as to guarantee that an inter-frequency cell that meets a measurement event can be measured and determined and at the same time the time for measurement by the terminal is reduced, thereby reducing the power consumption of the terminal and enhancing the performance of the terminal.

Figure 5:
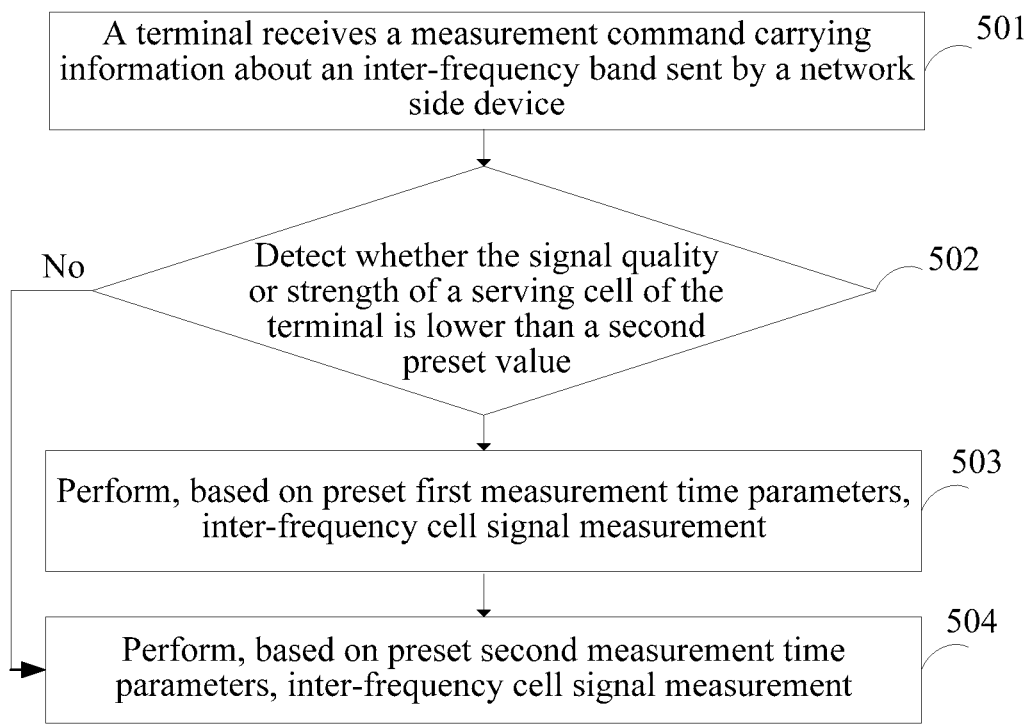
FIG. 5 is a flow chart of a method for inter-frequency cell measurement according to Embodiment 5 of the present invention.

FIG. 5 is a flow chart of a method for inter-frequency cell measurement according to Embodiment 5 of the present invention, in which the method may include:

Step 501. A terminal receives a measurement command carrying information about an inter-frequency band sent by a network side device.

Step 502. Detect whether the signal quality or strength of a serving cell of the terminal is lower than a second preset value. If yes, the process turns to step 503; and if no, the process turns to step 504.

The serving cell of the terminal may refer to, for example, a macrocell where the terminal is currently located, and the terminal may listen to the signal of the serving cell where the terminal is located and detect the signal quality or strength of the serving cell.

The second preset value may be carried in the measurement command, and may also be prestored in the terminal.

When the signal quality or strength of the serving cell of the terminal is lower than the second preset value, it indicates that the terminal needs to be switched to other cells as soon as possible to guarantee normal communications of the terminal. In this case, the terminal may be too far away from the serving cell to desirably receive the signal of the serving cell, so that the inter-frequency cell measurement needs to be performed as soon as possible, so as to determine an inter-frequency cell that meets a measurement event.

When the signal quality or strength of the serving cell of the terminal is greater than or equal to the second preset value, it indicates that the serving cell of the terminal may further continue to serve the terminal, and the terminal may receive the signal of the serving cell normally, so that the terminal does not have to be switched to an inter-frequency cell as soon as possible.

Of course, in another possible case, in heterogeneous network deployment, by taking an example in which a small cell is set in a macrocell, the small cell might be at the edge of the coverage of the macrocell. When a terminal monitors that the signal quality or strength of a serving cell is lower than a second preset value, it is regarded that the terminal is at the edge of the serving cell, and therefore the distance from the small cell is shorter, and it may be determined that a small cell is present in the periphery of the terminal. When the signal quality or strength of the serving cell of the terminal is greater than or equal to the second preset value, it may be regarded that an inter-frequency cell is not present in the periphery of the terminal, and the distance from the small cell is larger.

The second preset value may be specifically set according to actual application cases, for example, may be set according to the signal value received by a terminal when the terminal is located at a serving cell thereof and is capable of normally performing communications.

Step 503. Perform, based on time specifications of preset first measurement time parameters, inter-frequency cell signal measurement.

Specifically, after a receiving frequency is adjusted into the inter-frequency band, a search is performed to determine an inter-frequency cell located at the inter-frequency band, and next, based on time specifications of the preset first measurement time parameters, inter-frequency cell signal measurement is performed.

When it is determined that the signal quality or strength of a serving cell is lower than a second preset value, during a measurement gap period, an operation of determining an inter-frequency cell is performed, and inter-frequency cell signal measurement is performed based on time specifications of the second measurement time parameters.

Step 504. Perform, based on time specifications of preset second measurement time parameters, inter-frequency cell signal measurement.

Specifically, after a receiving frequency is adjusted into the inter-frequency band, a search is performed to determine an inter-frequency cell located at the inter-frequency band, and next, based on time specifications of the preset second measurement time parameters, inter-frequency cell signal measurement is performed.

The operation in step 503 and the operation in step 504 are different steps triggered according to the determination result in step 502, in which different measurement time parameters are adopted. Therefore, by performing step 503, the actual measurement time may be increased, so that an inter-frequency cell that meets a measurement event can be determined more quickly. By performing the operation in step 504, the actual measurement time is reduced, so that when the serving cell may further continue to serve the terminal, inter-frequency cell measurement may be performed based on the second measurement time parameters. Therefore, the electrical consumption of the terminal may be reduced, thereby lowering the power consumption of the terminal.

The first measurement time parameters and/or second measurement time parameters may be carried in the measurement command. That is, the network side device sends configured first measurement time parameters and/or second measurement time parameters to the terminal to request the terminal to perform measurement on a cell at an inter-frequency band.

Alternatively, the terminal needs to feed back, when performing inter-frequency cell measurement based on measurement time parameters, to the network side device identifiers of measurement time parameters to be adopted and/or an application moment of the measurement time parameters, which are carried in the measurement time parameters. The identifiers of measurement time parameters are used for distinguishing different measurement time parameters. The network side device may control, after receiving the identifiers of the measurement time parameters and/or the application moment of the measurement time parameters, at the application moment of the measurement time parameters, based on the time specified in the corresponding measurement time parameters, the sending of data and signaling.

Specifically, the network side device may determine, according to the application moment of the measurement time parameters fed back by the terminal, that is, a specific moment that the terminal performs measurement based on measurement time parameters or a specific moment of switching when measurement time parameters need to be switched, when to control the sending of data and signaling based on the time specified by the measurement time parameters.

Furthermore, the network side device determines, after receiving the identifiers of measurement time parameters, based on information about an appointment with the terminal, the application moment of the measurement time parameters corresponding to the identifiers of measurement time parameters.

The first measurement time parameters and/or the second measurement time parameters may be further saved in the network side device and the terminal, so that the terminal may measure, after receiving a measurement command, based on the first measurement time parameters and/or the second measurement time parameters, a cell at an inter-frequency band.

Alternatively, the terminal feeds back, when performing measurement based on the measurement time parameters, to the network side device the identifiers of measurement time parameters to be adopted, and may further feed back an application moment of the measurement time parameters.

Of course, the first measurement time parameters and/or second measurement time parameters may be further configured and saved by the terminal, so that the terminal performs, after receiving a measurement command, based on the first measurement time parameters and/or second measurement time parameters, inter-frequency cell measurement. During the inter-frequency cell measurement, current measurement information further needs to be fed back to the network side device. The measurement information may include the currently adopted measurement time parameters, that is, the first measurement time parameters and/or second measurement time parameters, and may further include an application moment of the measurement time parameters. Therefore, the network side device may control, according to the current measurement time parameters, the operations of data and signaling transmission with the terminal.

When the first measurement time parameters and/or the second measurement time parameters are prestored in the terminal, the terminal first determines, after receiving the measurement command, whether a measurement identifier is carried in the measurement command. If yes, the terminal then performs the operations in step 502 to step 504; and if no, it performs measurement based on a conventional manner.

In this embodiment, the terminal monitors whether the signal quality or strength of a serving cell is lower than a second preset value, if yes, performs, based on the time specified in the first measurement time parameters, inter-frequency cell signal measurement, and if no, performs, based on the time specified in the second measurement time parameters, inter-frequency cell signal measurement, so as to determine an inter-frequency cell that meets a measurement event as soon as possible and at the same time reduce the time for measurement of the terminal, thereby reducing the power consumption of the terminal and enhancing the performance of the terminal.

Figure 6:
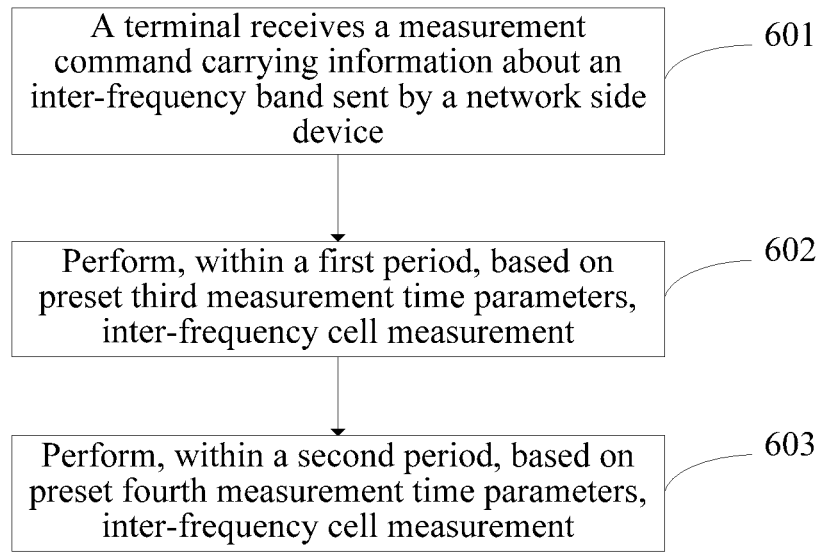
FIG. 6 is a flow chart of a method for inter-frequency cell measurement according to Embodiment 6 of the present invention.

FIG. 6 is a flow chart of a method for inter-frequency cell measurement according to Embodiment 6 of the present invention, in which the method includes:

Step 601. A terminal receives a measurement command carrying information about an inter-frequency band sent by a network side device.

For details about this step, reference may be specifically made to step 101 in the method embodiment.

Step 602. Perform, within a first period, based on preset third measurement time parameters, inter-frequency cell measurement.

Step 603. Perform, within a second period, based on preset fourth measurement time parameters, inter-frequency cell measurement.

The specific process of performing inter-frequency cell measurement is that a terminal first needs to adjust a receiving frequency into the inter-frequency band, performs a search to determine an inter-frequency cell, and next performs, based on the time specifications of the measurement time parameters, inter-frequency cell signal measurement, so as to determine an inter-frequency cell whose signal meets a measurement event.

The first period and second period may be provided by the network side device. That is, the network side device starts, after sending a measurement command to the terminal, to count the first period, sends, when the first period ends, first adjustment trigger information to the terminal, and at the same time starts to count a second period, and sends, when the second period ends, second adjustment trigger information to the terminal, and at the same time restarts to count the first period. Therefore, the terminal specifically performs, after receiving the measurement command or second adjustment trigger information, based on first measurement time parameters, inter-frequency cell measurement. After receiving the first adjustment trigger information, that is, inter-frequency cell measurement is performed based on second measurement time parameters.

Of course, the first period and second period may be controlled by the terminal, the specific duration of the period may be allocated by the terminal in advance, and may also be carried in the measurement command of the network side device.

When the first period and second period are controlled by the terminal, the terminal may first determine, after receiving the measurement command, whether the measurement command carries a measurement identifier; if yes, the terminal then performs the operations in steps 602 and 603; and if no, it performs measurement based on a conventional manner.

In this embodiment, the first period and second period alternately form a continuous time; that is to say, the terminal performs, within a first period, based on time specifications of preset third measurement time parameters which include a measurement gap duration, a gap repetition cycle, and the like, inter-frequency cell measurement, enters, when the first period ends, a second period and performs, based on preset fourth measurement time parameters, inter-frequency cell measurement, and enters, when the second period ends, the first period again. That is, the first period and the second period alternately form a continuous time, through the alternating first period and second period, the terminal is capable of performing, based on the time specified in different measurement time parameters, inter-frequency cell measurement.

The third measurement time parameters and the fourth measurement time parameters are different. That is to say, when inter-frequency cell measurement is performed based on the time specifications of the third measurement time parameters and the fourth measurement time parameters, respectively, the electrical consumption for measurement of the terminal is different, causing different power consumption for the terminal. Through the alternating first period and second period, the terminal does not always perform measurement based on one type of measurement time parameters, also the probability that the terminal measures an inter-frequency cell that meets a measurement event is guaranteed, and at the same time the power consumption of the terminal may be lowered.

The third gap duration in the third measurement time parameters may be smaller than the fourth gap duration in the fourth measurement time parameters, and/or the third gap repetition cycle is greater than the fourth gap repetition cycle, and/or the third minimum available measurement time is smaller than the fourth minimum available measurement time. Alternatively, the third gap duration is greater than the fourth gap duration, and/or the third gap repetition cycle is smaller than the fourth gap repetition cycle, and/or the third minimum available measurement time is greater than the fourth minimum available measurement time.

The time length of the first period and the second period may be different or may be the same, and may be specifically set according to different actual cases. For example, it is assumed that the terminal performs, based on the time specifications of the third measurement time parameters, inter-frequency cell measurement, compared with the inter-frequency cell measurement based on the time specifications of the fourth measurement time parameters, the electrical consumption can be saved. Therefore, when the first period is longer, the terminal is more power saving, and when the second period is longer, the probability is higher that the terminal determines an inter-frequency cell that meets a measurement event, so that the length of the period may be specifically set according to different demands.

It should be noted that, in this embodiment, the objective of inter-frequency cell measurement is achieved in a manner of setting two periods, and of course, a plurality of periods, for example, three, may be set, and correspondingly a plurality of measurement time parameters is correspondingly set, and technical solutions extended by persons skilled in the art on the basis of the present invention shall also fall within the protection scope of the present invention.

In this embodiment, a terminal performs, based on the time specifications of different measurement time parameters, inter-frequency cell measurement within different periods, and different measurement time parameters specify different actual measurement time, so that the terminal does not always perform inter-frequency cell measurement based on one type of measurement time parameters, so as to reduce the electrical consumption for measurement of the terminal, thereby reducing the power consumption of the terminal, and at the same time the terminal does not always perform inter-frequency cell measurement on based on one type of measurement time parameters, so as to guarantee the probability that the terminal determines an inter-frequency cell that meets a measurement within a certain time.

Figure 7:
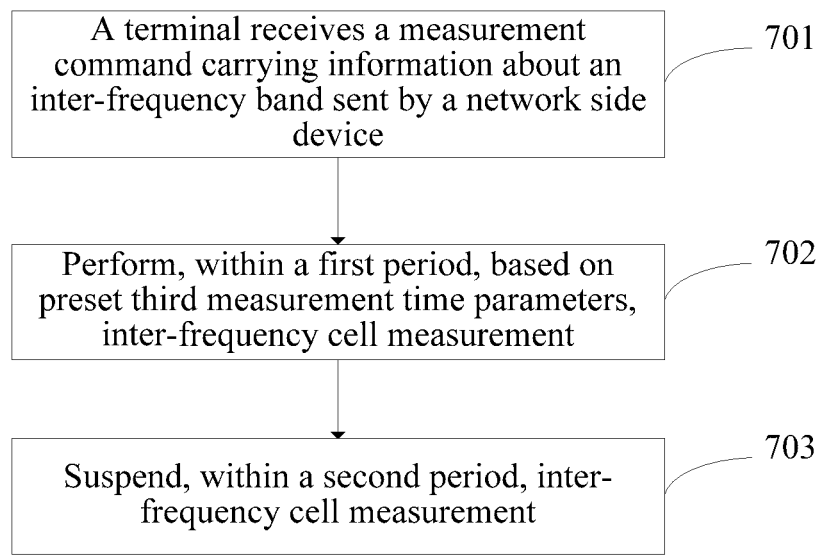
FIG. 7 is a flow chart of a method for inter-frequency cell measurement according to Embodiment 7 of the present invention.

FIG. 7 is a flow chart of a method for inter-frequency cell measurement according to Embodiment 7 of the present invention, in which the method may include:

Step 701. A terminal receives a measurement command carrying information about an inter-frequency band sent by a network side device.

Step 702. Perform, within a first period, based on preset third measurement time parameters, inter-frequency cell measurement.

Step 703. Suspend, within a second period, inter-frequency cell measurement, where the first period and second period alternately form a continuous time.

The difference between this embodiment and method Embodiment 6 lies in that, within a second period, a terminal may suspend inter-frequency cell measurement. That is to say, the terminal performs, within a first period, based on the time specifications of preset third measurement time parameters which include a measurement gap duration, a gap repetition cycle, and the like, inter-frequency cell measurement, the terminal enters, when the first period ends, a second period, and suspends inter-frequency cell measurement, and the terminal enters, when the second period ends, the first period again to continue to perform, based on the time specifications of the preset third measurement time parameters, inter-frequency cell measurement. That is, the first period and the second period alternately form a continuous time, and through the alternating first period and second period, the terminal may perform no measurement within a period, so as to reduce the electrical consumption for measurement of the terminal and lower the power consumption of the terminal, and guarantee the probability that the terminal determines an inter-frequency cell that meets a measurement within a certain time.

The first period and the second period may be specifically set according to actual cases, for example, the specific requirements for the terminal or the requirements for the measured inter-frequency cell.

Figure 8:
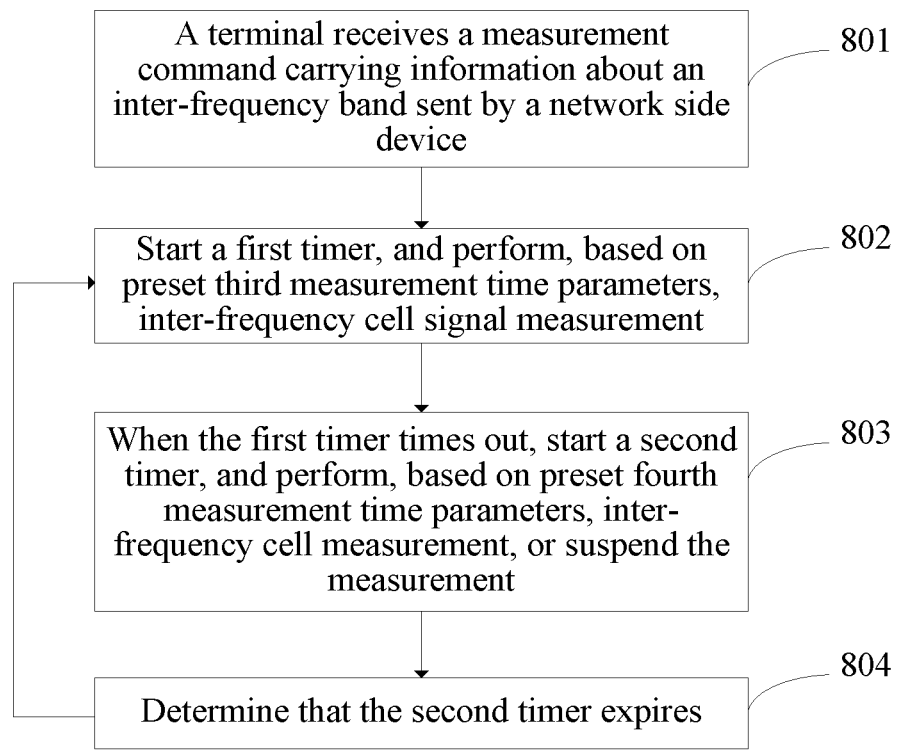
FIG. 8 is a flow chart of a method for inter-frequency cell measurement according to Embodiment 8 of the present invention.

FIG. 8 is a flow chart of a method for inter-frequency cell measurement according to Embodiment 8 of the present invention. The method in this embodiment is a possible implementation process for method Embodiment 6 or method Embodiment 7, in which the method may include:

Step 801. A terminal receives a measurement command carrying information about an inter-frequency band sent by a network side device.

Step 802. Start a first timer, and perform, based on preset third measurement time parameters, inter-frequency cell signal measurement.

The first timer is configured to provide the first period. Specifically, by setting a duration of the first timer, the first period may be from when the first timer starts to when the first timer stops as the duration ends. The terminal may first perform, after receiving a measurement command, based on the time specified in preset third measurement time parameters, inter-frequency cell measurement, and at the same time start the first timer.

Step 803. When the first timer expires, start a second timer, and perform, based on preset fourth measurement time parameters, inter-frequency cell measurement, or suspend the measurement.

Step 804. Return, after it is determined that the second timer expires, to step 802.

The second timer provides a second period. Specifically, by setting a duration of the second timer, the second period may be from when the second timer starts to when the second timer stops as the duration ends.

The duration parameters set for the first timer and the second timer may be carried in the measurement command, and may also be preconfigured by the terminal.

The terminal may first determine, after receiving the measurement command, whether a measurement identifier is carried in the measurement command, and if yes, perform the operations in step 802 to step 804.

In this embodiment, alternatively, the third gap duration in the third measurement time parameters is greater than the fourth gap duration in the fourth measurement time parameters, and/or the third gap repetition cycle is smaller than the fourth gap repetition cycle, and/or the third minimum available measurement time is greater than the fourth minimum available measurement time. The terminal may first perform, based on the third measurement time parameters that enable an inter-frequency cell that meets a measurement event to be determined more quickly, inter-frequency cell measurement, set the time length that the terminal performs, based on the third measurement time parameters, inter-frequency cell measurement, and perform, when the first period ends, based on the preset fourth measurement time parameters, inter-frequency cell measurement, or suspend the measurement, so as to reduce the electrical consumption of the terminal to a certain degree, and lower the power consumption of the terminal.

Figure 9:
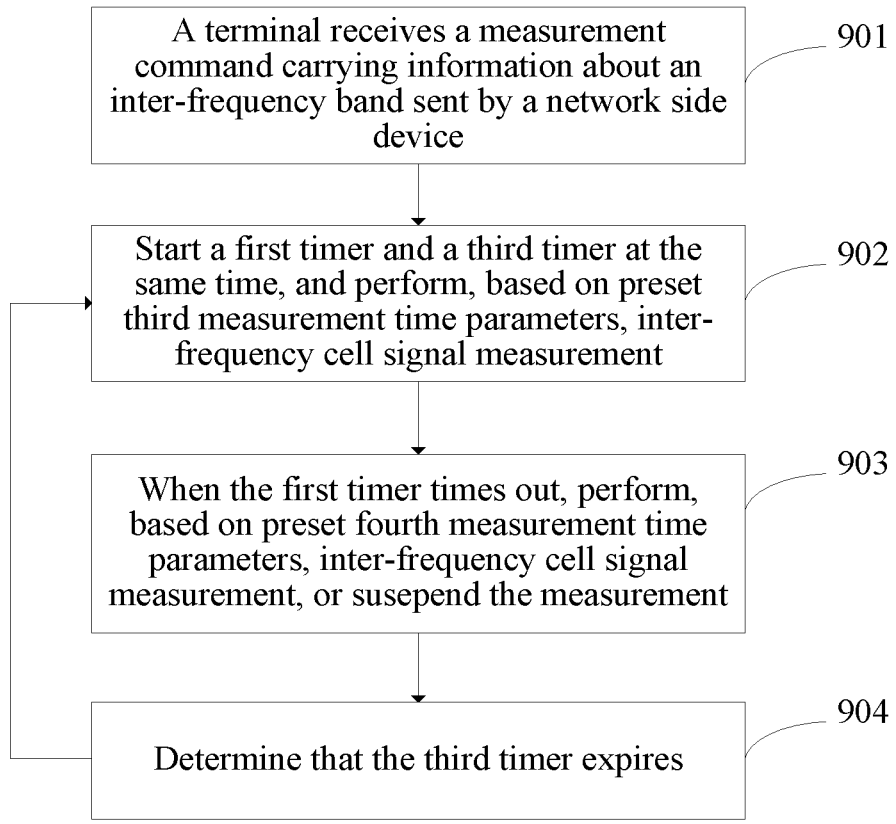
FIG. 9 is a flow chart of a method for inter-frequency cell measurement according to Embodiment 9 of the present invention.

FIG. 9 is a flow chart of a method for inter-frequency cell measurement according to Embodiment 9 of the present invention, in which the method may include:

Step 901. A terminal receives a measurement command carrying information about an inter-frequency band sent by a network side device.

Step 902. Start a first timer and a third timer at the same time, and perform, based on preset third measurement time parameters, inter-frequency cell signal measurement.

Step 903. When the first timer expires, perform, based on preset fourth measurement time parameters, inter-frequency cell signal measurement, or suspend the measurement.

Step 904. Determine that the third timer expires, and return to step 902.

In this embodiment, the first period and the second period are provided by two timers.

The duration of the first timer is smaller than the duration of the third timer. That is, the first period is from when the first timer starts to when the first timer stops as the duration ends. The second period is from when the first timer stops to when the third timer stops as the set duration ends.

The terminal may first determine, after receiving the measurement command, whether a measurement identifier is carried in the measurement command, and if yes, perform the operations in step 902 to step 904.

In this embodiment, alternatively, the third gap duration in the third measurement time parameters is greater than the fourth gap duration in the fourth measurement time parameters, and/or the third gap repetition cycle is smaller than the fourth gap repetition cycle, and/or the third minimum available measurement time is greater than the fourth minimum available measurement time. The terminal may first perform, based on the third measurement time parameters that enable an inter-frequency cell that meets a measurement event to be determined more quickly, inter-frequency cell measurement, set the time length that the terminal performs, based on the third measurement time parameters, inter-frequency cell measurement, and perform, when the first period ends, based on the preset fourth measurement time parameters, inter-frequency cell measurement, or suspend the measurement, so as to reduce the electrical consumption of the terminal to a certain degree and lower the power consumption of the terminal.

It should be noted that, in the foregoing method embodiments, reference may be made between the operations of the same or similar steps, and therefore the corresponding descriptions in several embodiments are relatively simple.

Figure 10:
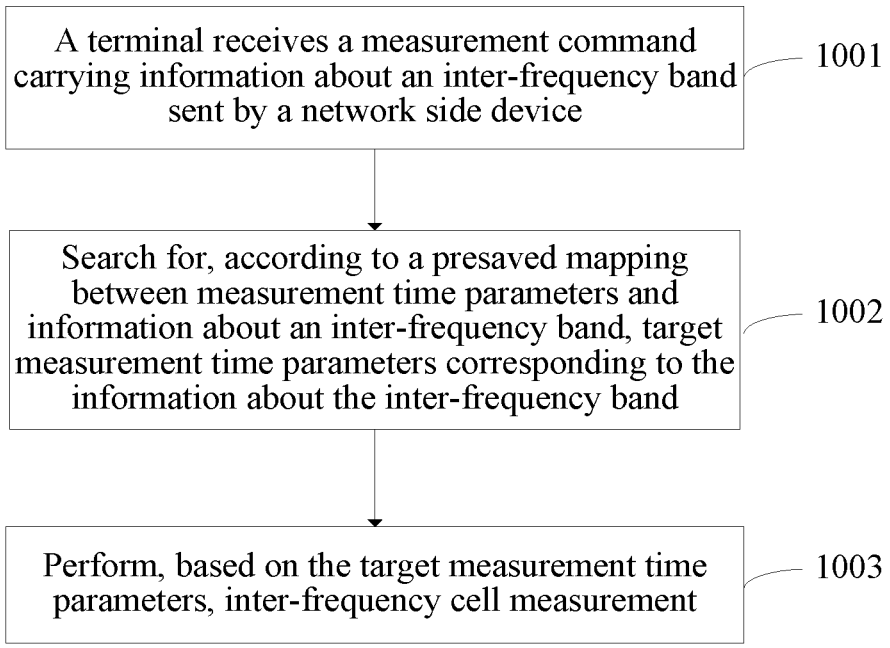
FIG. 10 is a flow chart of a method for inter-frequency cell measurement according to Embodiment 10 of the present invention.

FIG. 10 is a flow chart of a method for inter-frequency cell measurement according to Embodiment 10 of the present invention, in which the method may include:

Step 1001. A terminal receives a measurement command carrying information about an inter-frequency band sent by a network side device.

Step 1002. Search for, according to a presaved mapping between measurement time parameters and information about an inter-frequency band, target measurement time parameters corresponding to the information about the inter-frequency band.

The measurement command sent from the network side may further carry a measurement identifier, so that the terminal may first determine, after receiving the measurement command, whether the measurement command carries the measurement identifier, if yes, perform the operation of step 1002, and if no, directly perform, based on general measurement time parameters, inter-frequency cell measurement.

As a terminal might perform measurement on cells at a plurality of different inter-frequency bands, and in this embodiment, each piece of information about an inter-frequency band might correspond to different measurement time parameters. That is to say, in this embodiment, the terminal may perform, based on different measurement time parameters, parallel measurement on cells at different inter-frequency bands. Therefore, the terminal may first send a capability identifier to the network side device, and the network side device may determine, after receiving the capability identifier, that the terminal has the capability of measuring in parallel cells at different inter-frequency bands based on different measurement time parameters, and then send to the terminal the measurement command carrying the measurement identifier.

Step 1003. Perform, based on the target measurement time parameters, inter-frequency cell measurement.

In performing the inter-frequency cell measurement, a search is performed first to determine a cell at an inter-frequency band, and next inter-frequency cell signal measurement is performed to determine whether the signal of the inter-frequency cell meets a measurement event. In practical applications, for inter-frequency cells at different bands, as the measurement demands are different, the time required to find inter-frequency cells at some bands or to determine that signals of some bands meet a measurement event is short, whereas the time required to find inter-frequency cells of some bands or to determine that signals of some bands meet a measurement event is long. General measurement time parameters are adopted in the prior art, resulting in that, during the inter-frequency cell measurement, an inter-frequency cell that meets a measurement event cannot be measured quickly, or the electrical consumption for measurement is wasted.

Therefore, in the present invention, measurement time parameters are set in advance according to different information about an inter-frequency band, and a mapping between information about an inter-frequency band and different identifiers of measurement time parameters are saved. For some inter-frequency bands, if a cell at an inter-frequency band needs to be measured more quickly, the gap duration in the measurement time parameters may be suitably prolonged, the gap repetition cycle is shortened, and the minimum available measurement time is increased, so as to measure an inter-frequency cell that meets a measurement event more quickly.

For some information about an inter-frequency band, if an inter-frequency cell that meets a measurement event does not need to be measured more quickly, the gap duration in the measurement time parameters may be shortened, the gap repetition cycle is prolonged, and the minimum available measurement time is decreased, so as to achieve the objective of saving the power consumption of the terminal.

The performing, based on the target measurement time parameters, inter-frequency cell measurement is specifically:

performing, after a receiving frequency is adjusted into the inter-frequency band, a search to determine an inter-frequency cell located at the inter-frequency band; and performing, based on the time specifications of the target measurement time parameters, inter-frequency cell signal measurement.

In this embodiment, a terminal first searches for, after receiving a measurement command carrying information about an inter-frequency band sent by a network side device, according to a presaved mapping between measurement time parameters and information about an inter-frequency band, target measurement time parameters corresponding to the information about the inter-frequency band, and performs, based on the target measurement time parameters, inter-frequency cell measurement. According to different information about an inter-frequency band, based on different measurement time parameters, inter-frequency cell measurement is performed to determine a cell that meets a measurement event more quickly, and at the same time further save the power consumption of the terminal and enhance the performance of the terminal.

Figure 11:
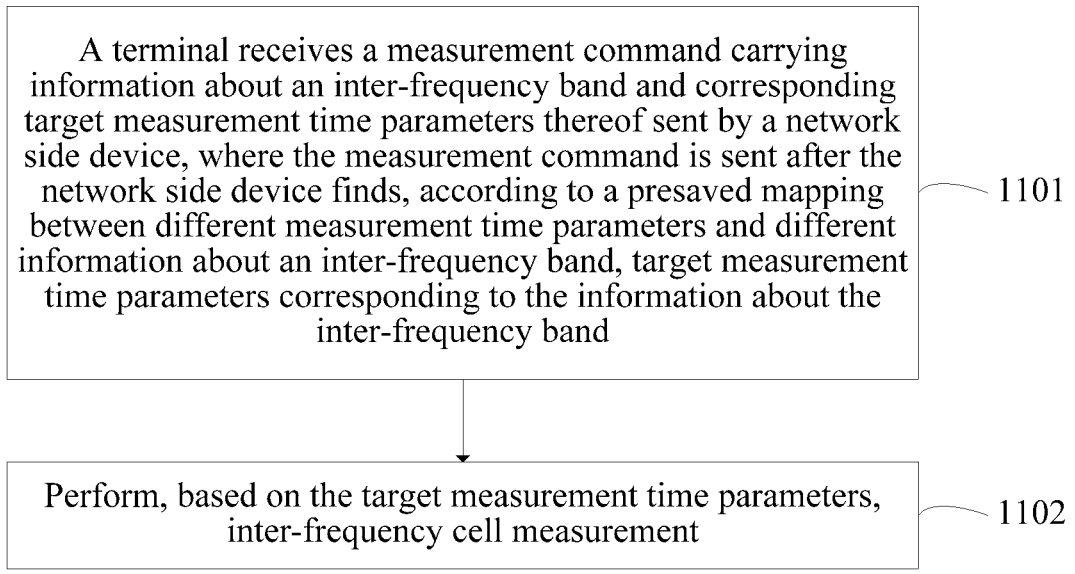
FIG. 11 is a flow chart of a method for inter-frequency cell measurement according to Embodiment 11 of the present invention.

FIG. 11 is a flow chart of a method for inter-frequency cell measurement according to Embodiment 11 of the present invention, in which the method may include:

Step 1101. A terminal receives a measurement command carrying information about an inter-frequency band and corresponding target measurement time parameters thereof sent by a network side device, where the measurement command is sent after the network side device finds, according to a presaved mapping between different measurement time parameters and different information about an inter-frequency band, target measurement time parameters corresponding to the information about the inter-frequency band.

Step 1102. Perform, based on the target measurement time parameters, inter-frequency cell measurement.

The terminal may perform, after receiving the measurement command, based on target measurement time parameters carried in the measurement command, inter-frequency cell measurement.

Before step 1101 is performed, the terminal may further send a capability identifier to the network side device, and the network side device may determine, after receiving the capability identifier, that the terminal is capable of measuring in parallel cells at different inter-frequency bands based on different measurement time parameters. Therefore, the network side device first searches for, when sending a measurement command, according to a presaved mapping between measurement time parameters and information about an inter-frequency band, target measurement time parameters corresponding to the information about the inter-frequency band, and then sends the measurement command, and the terminal may then perform, based on the target measurement time parameters, inter-frequency cell measurement, so as to determine a cell that meets a measurement event more quickly, and at the same time further save the power consumption of the terminal and enhance the performance of the terminal.

Figure 12:
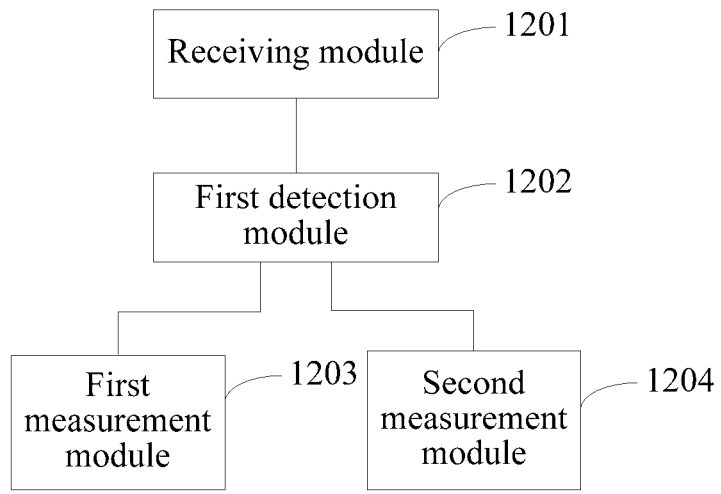
FIG. 12 is a schematic structural view of a device for inter-frequency cell measurement according to Embodiment 1 of the present invention.

FIG. 12 is a schematic structural view of a device for inter-frequency cell measurement according to Embodiment 1 of the present invention, in which the device may include:

A receiving module 1201 is configured to receive a measurement command carrying information about an inter-frequency band sent by a network side device.

The device in this embodiment may be specifically applied in a terminal, the measurement command includes the information about an inter-frequency band, for example, the frequency of a cell to be measured, and the terminal may determine, according to the information about the inter-frequency band, an inter-frequency cell located at the band and perform measurement.

A first detection module 1202 is configured to detect whether a candidate cell is present within a certain range of a current position.

The current position may refer to the position of the device or a terminal containing the device in the serving cell, and the candidate cell may include an inter-frequency cell at a band that currently needs to be measured, which is a candidate cell distinguished from the serving cell of the terminal.

A first measurement module 1203 is configured to perform, based on preset first measurement time parameters, inter-frequency cell signal measurement.

The measurement time parameters may include a gap duration, that is, an available time in each time of measurement; a gap repetition cycle, that is, an interval time between gaps; and a minimum available measurement time, in which the sum of time for actual measurement within a certain time range should not be smaller than the minimum available measurement time, so as to limit the actual time that the terminal performs measurement within the certain time, so that the inter-frequency cell measurement is capable of meeting a certain demand. For example, the gap duration is 6 ms (milliseconds), the gap repetition cycle is 80 ms, and the minimum available time within 480 ms is 30 ms; that is to say, the terminal may perform signal measurement once every 80 ms, each time of measurement takes 6 ms, and the minimum available time specifies that the terminal at least performs measurement (30 ms/6 ms)=5 times within every 480 ms.

A second measurement module 1204 is configured to perform, based on preset second measurement time parameters, inter-frequency cell signal measurement.

The first measurement time parameters include a first gap duration, a first gap repetition cycle, and a first minimum available measurement time, the second measurement time parameters include a second gap duration, a second gap repetition cycle, and a second minimum available measurement time, the first gap duration is longer than the second gap duration, and/or the second gap repetition cycle is shorter than the second gap repetition cycle, and/or the first minimum available measurement time is greater than the second minimum available measurement time. That is to say, compared with the inter-frequency cell signal measurement on the second measurement time parameters, the actual time for inter-frequency cell measurement within a certain period is longer in the inter-frequency cell signal measurement on the first measurement time parameters, so that an inter-frequency cell that satisfies a measurement requirement can be selected more quickly.

In an embodiment, the first measurement time parameters and/or second measurement time parameters may be carried in the measurement command. Therefore, the device may further include a first feedback module, configured to feed back to the network side device identifiers of measurement time parameters to be adopted and/or an application moment of the measurement time parameters.

In another embodiment, the device may further include a saving module, configured to save the first measurement time parameters and/or second measurement time parameters. Therefore, the first measurement time parameters and/or the second measurement time parameters may be further saved in network side device and in the saving module of the device, respectively, so that the device may further include a first feedback module, configured to feed back to the network side device the identifiers of measurement time parameters to be adopted and/or the application moment of the measurement time parameters.

In still another embodiment, the first measurement time parameters and/or second measurement time parameters may further be saved in the saving module of the device only. Therefore, alternatively, the device may further include a second feedback module, configured to feed back to the network side device current measurement information, and the measurement information includes the first measurement time parameters and/or second measurement time parameters.

In addition, the device may further include a second determination module, configured to determine whether a measurement identifier is carried in the measurement command, and if yes, trigger the first detection module to start.

In this embodiment, the receiving module performs, after receiving the measurement command of the network side device, when the first detection module detects that a candidate cell is present in the periphery of the position thereof, based on the first measurement time parameters, inter-frequency cell signal measurement, so as to determine more quickly an inter-frequency cell that meets a measurement event; when a candidate cell is not present in the periphery of the terminal, performs, based on second measurement time parameters, inter-frequency cell signal measurement, so as to reduce the time for measurement and lower the power consumption of the device. As it is determined that a candidate cell is not present in the periphery of the current position, it indicates that the terminal is away from all inter-frequency cells by a long distance, so that the signal measurement is performed based on second measurement time parameters that are more power saving, and the power consumption for measurement is lowered, thereby enhancing the performance of the device.

Figure 13:
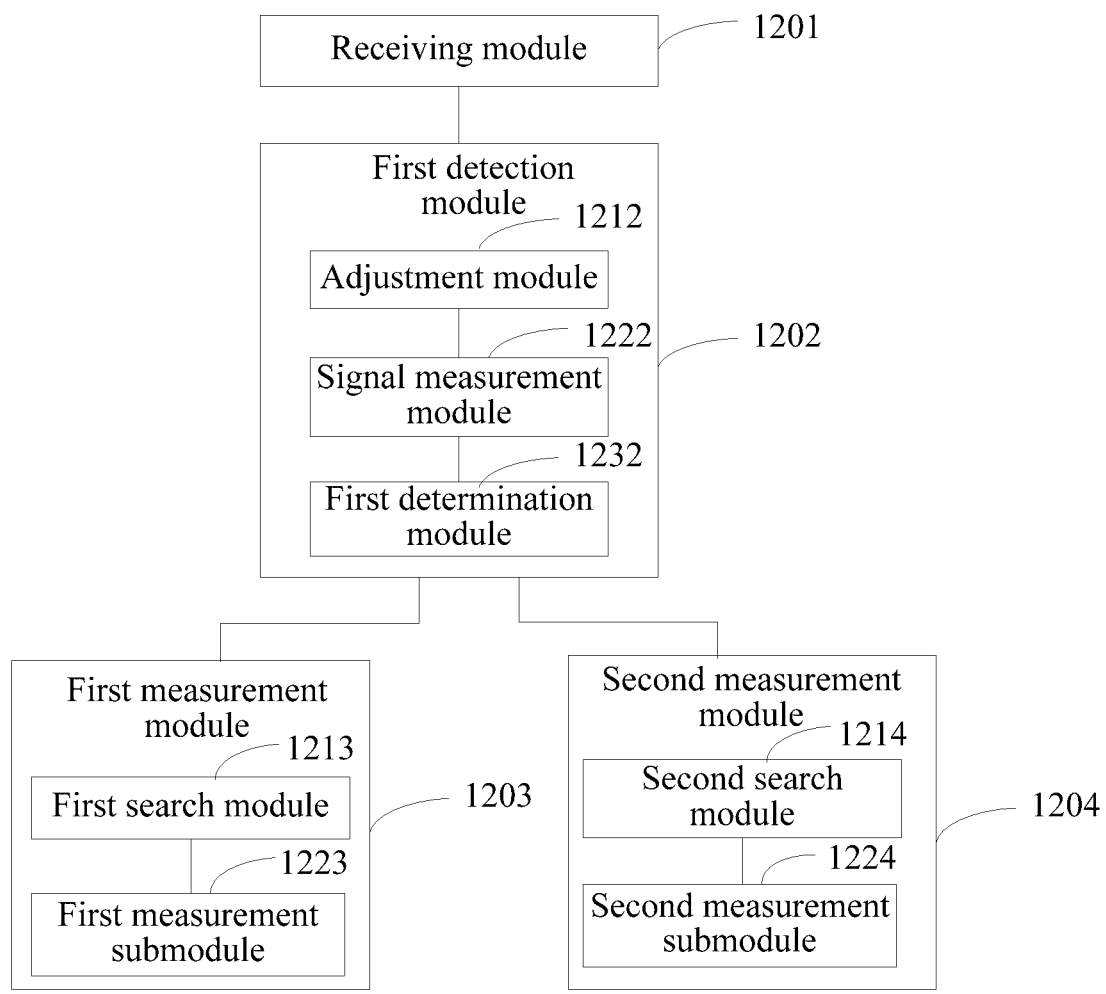
FIG. 13 is a schematic structural view of a device for inter-frequency cell measurement according to Embodiment 2 of the present invention.

FIG. 13 is a schematic structural view of a device for inter-frequency cell measurement according to Embodiment 2 of the present invention. The device may include a receiving module 1201, a first detection module 1202, a first measurement module 1203 and a second measurement module 1204. For the specific functions of the modules, reference may be made to device Embodiment 1.

The first detection module 1202 may specifically include:

An adjustment module 1212 adjusts a receiving frequency into the inter-frequency band.

A signal measurement module 1222 is configured to measure the signal quality or strength of a common channel of the inter-frequency band.

A first determination module 1223 is configured to determine whether the signal quality or strength of the common channel of the inter-frequency band is higher than a first preset value, if yes, trigger the first measurement module 1203, and if no, trigger the second measurement module 1204.

The first preset value may be carried in the measurement command, and of course may also be preset and stored in the saving module of the device, and the first determination module first determines the first preset value from the measurement command or the saving module and then performs determination.

The first measurement module 1203 may specifically include:

A first search module 1213 is configured to perform, after the receiving frequency is adjusted into the inter-frequency band, a search to determine an inter-frequency cell located at the inter-frequency band.

A first measurement submodule 1223 is configured to perform, based on preset first measurement time parameters, inter-frequency cell signal measurement.

The second measurement module 1204 may include:

A second search module 1214 is configured to perform, after the receiving frequency is adjusted into the inter-frequency band, a search to determine an inter-frequency cell located at the inter-frequency band.

The second measurement submodule 1224 is configured to perform, based on preset second measurement time parameters, inter-frequency cell signal measurement.

The first gap duration in the first measurement time parameters is longer than the second gap duration in the second measurement time parameters, and/or the first gap repetition cycle is shorter than the second gap repetition cycle, and/or the first minimum available measurement time is longer than the second minimum available measurement time. That is to say, compared with the inter-frequency cell signal measurement on the second measurement time parameters, the inter-frequency cell signal measurement on the first measurement time parameters provides a longer time for inter-frequency cell measurement, so as to select more quickly an inter-frequency cell that meets a measurement event requirement.

The first measurement time parameters and/or second measurement time parameters may be carried in the measurement command, and the device may further include:

A first feedback module is configured to feed back to the network side device the currently adopted identifiers of measurement time parameters and/or an application moment of the measurement time parameters.

When the first measurement time parameters and/or second measurement time parameters are prestored, the device may further include:

A second determination module is configured to determine whether a measurement identifier is carried in the measurement command, and if yes, trigger the first detection module to start.

A second feedback module is configured to feed back to the network side device current measurement information, where the measurement information includes the first measurement time parameters and/or second measurement time parameters.

In addition, when the first search module 1213 performs a search to determine an inter-frequency cell, a certain search time is needed. Therefore, the first search module 1213 may be further configured to switch, when monitoring that the search time exceeds a preset time, and if the first search module 1213 fails to find any cell on the inter-frequency band within a preset time, the currently adopted measurement time parameters, and trigger the second measurement module to start, so that the device continues measurement based on the time specifications of the second measurement time parameters.

In this embodiment, when the first detection module determines whether a cell is present within a certain range of the terminal by measuring whether the signal quality or strength of the common channel of the inter-frequency band is higher than a first preset value, if yes, triggers the first measurement module to perform, based on the time specified in the first measurement time parameters, inter-frequency cell signal measurement, and if no, triggers the second measurement module to perform, based on the time specified in the second measurement time parameters, inter-frequency cell signal measurement, so as to measure and determine an inter-frequency cell that meets a measurement event more quickly, further reduce the time for measurement of the device, thereby reducing the power consumption of the device and enhancing the performance of the device.

Additionally, in another embodiment, the first detection module 1203 may be specifically configured to determine whether a candidate cell is present at a certain distance away from a current position through a satellite positioning system, if yes, trigger the first measurement module to start, and if no, trigger the second measurement module to start.

Figure 14:
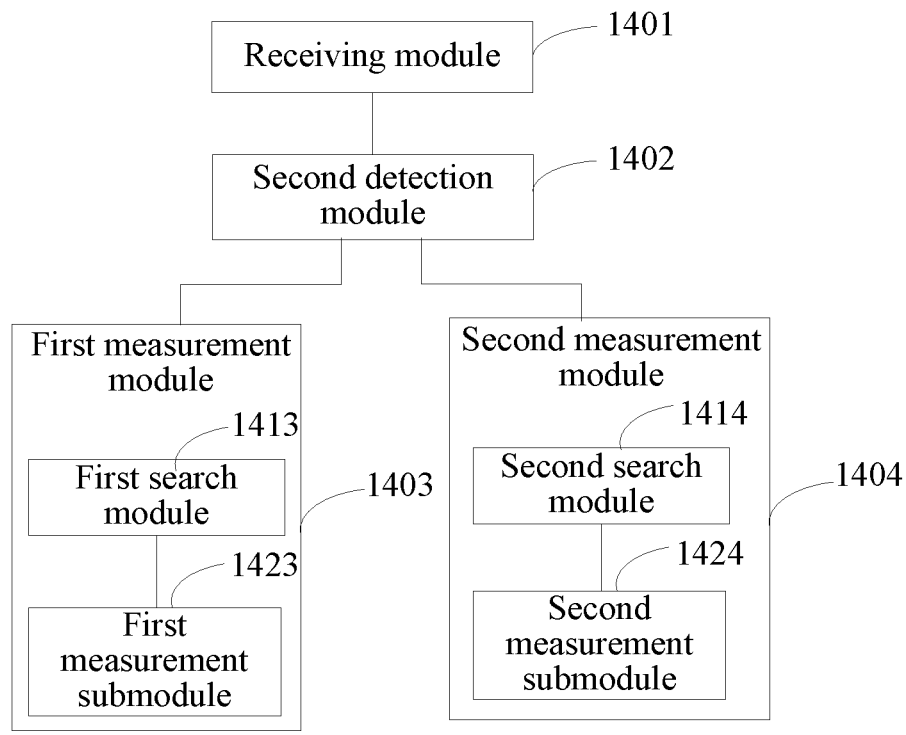
FIG. 14 is a schematic structural view of a device for inter-frequency cell measurement according to Embodiment 3 of the present invention.

FIG. 14 is a schematic structural view of a device for inter-frequency cell measurement according to Embodiment 3 of the present invention, in which the device may include:

A receiving module 1401 is configured to receive a measurement command carrying information about an inter-frequency band sent by a network side device.

A second detection module 1402 is configured to detect whether the signal quality or strength of a serving cell is lower than a second preset value.

The serving cell may refer to, for example, a macrocell where the terminal is currently located, and the terminal may listen to the signal of the serving cell and detect the signal quality or strength of the serving cell.

The second preset value may be carried in the measurement command, and of course may also be preset and stored in the saving module of the device, and the second detection module first determines the first preset value from the measurement command or the saving module and then performs determination.

When the signal quality or strength of a serving cell is lower than the second preset value, it indicates that the terminal needs to be switched to other cells as soon as possible to guarantee normal communications of the terminal. In this case, the terminal may be too far away from the serving cell to desirably receive the signal of the serving cell, so that the inter-frequency cell measurement needs to be performed as soon as possible, so as to determine an inter-frequency cell that meets a measurement event.

When the signal quality or strength of the serving cell is greater than or equal to the second preset value, it indicates that the serving cell may further continue to serve the terminal, and the terminal may receive the signal of the serving cell normally, so that the terminal does not have to be switched to an inter-frequency cell as soon as possible.

Of course, in another possible case, in heterogeneous network deployment, by taking an example in which a small cell is set in a macrocell, the small cell might be at the edge of the coverage of the macrocell. When it is monitored that the signal quality or strength of a serving cell is lower than a second preset value, it is regarded that the terminal is at the edge of the serving cell, and therefore the distance from the small cell is shorter, and it may be determined that a small cell is present in the periphery of the terminal. When the signal quality or strength of the serving cell of the terminal is greater than or equal to the second preset value, it may be regarded that an inter-frequency cell is not present in the periphery of the terminal, and the distance from the small cell is larger.

A first measurement module 1403 is configured to perform, when the detection result of the second detection module is yes, based on preset first measurement time parameters, inter-frequency cell measurement.

The first measurement module 1403 may specifically include:

A first search module 1413 is configured to perform, after the receiving frequency is adjusted into the inter-frequency band, search, determine an inter-frequency cell located at the inter-frequency band.

A first measurement submodule 1423 is configured to perform, based on preset first measurement time parameters, inter-frequency cell signal measurement.

A second measurement module 1404 is configured to perform, when the detection result of the second detection module is no, based on preset second measurement time parameters, inter-frequency cell measurement.

The first measurement time parameters include a first gap duration, a first gap repetition cycle, and a first minimum available measurement time, the second measurement time parameters include a second gap duration, a second gap repetition cycle, and a second minimum available measurement time, and the first gap duration is longer than the second gap duration, and/or the second gap repetition cycle is shorter than the second gap repetition cycle, and/or the first minimum available measurement time is longer than the second minimum available measurement time.

The second measurement module 1404 may specifically include:

A second search module 1414 is configured to perform, after the receiving frequency is adjusted into the inter-frequency band, a search to determine an inter-frequency cell located at the inter-frequency band.

A second measurement submodule 1424 is configured to perform, based on preset second measurement time parameters, inter-frequency cell signal measurement.

In an embodiment, the first measurement time parameters and/or second measurement time parameters may be carried in the measurement command. Therefore, the device may further include a first feedback module, configured to feed back to the network side device identifiers of measurement time parameters to be adopted and/or an application moment of the measurement time parameters.

In another embodiment, the device may further include a saving module, configured to save the first measurement time parameters and/or second measurement time parameters. Therefore, the first measurement time parameters and/or second measurement time parameters are further saved in the network side device and in the saving module of the device, respectively, so that the device may further include a first feedback module, configured to feed back to the network side device identifiers of measurement time parameters to be adopted and/or an application moment of the measurement time parameters.

In still another embodiment, the first measurement time parameters and/or second measurement time parameters may further be saved in the saving module of the device only. Therefore, alternatively, the device may further include a second feedback module, configured to feed back to the network side device current measurement information, where the measurement information includes the first measurement time parameters and/or second measurement time parameters.

In addition, the device may further include a second determination module, configured to determine whether a measurement identifier is carried in the measurement command, and if yes, trigger the first detection module to start.

In this embodiment, the first detection module detects whether the signal quality or strength of a serving cell is lower than a second preset value, if yes, trigger the first measurement module to perform, based on the time specified in the first measurement time parameters, a inter-frequency cell signal measurement, and if no, trigger the second measurement module to perform, based on the time specified in the second measurement time parameters, inter-frequency cell signal measurement, so as to determine an inter-frequency cell that meets a measurement event as soon as possible, so as to reduce the time for measurement of the device, thereby reducing the power consumption of the device and enhancing the performance of the device.

Figure 15:
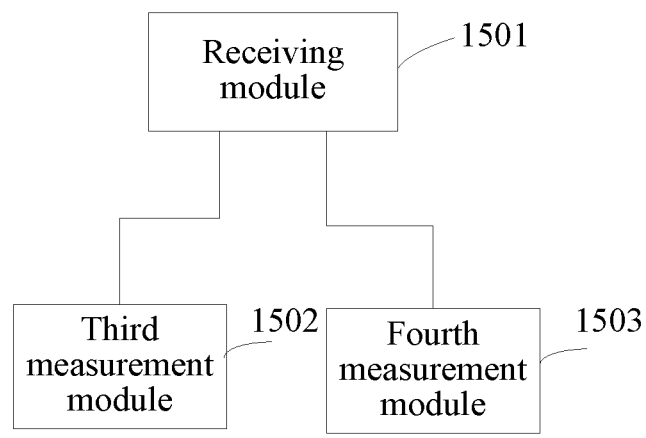
FIG. 15 is a schematic structural view of a device for inter-frequency cell measurement according to Embodiment 4 of the present invention.

FIG. 15 is a schematic structural view of a device for inter-frequency cell measurement according to Embodiment 4 of the present invention, in which the device may include:

A receiving module 1501 is configured to receive a measurement command carrying information about an inter-frequency band sent by a network side device.

A third measurement module 1502 is configured to perform, within a first period, based on preset third measurement time parameters, inter-frequency cell measurement.

A fourth measurement module 1503 is configured to perform, within a second period, based on preset fourth measurement time parameters, inter-frequency cell measurement, or suspend inter-frequency cell measurement, where the first period and second period alternately form a continuous time, and the third measurement time parameters are different from the fourth measurement time parameters.

The first period and second period may be provided by the network side device. That is, the network side device may start, after sending the measurement command, to count the first period, and send, when the first period ends, first adjustment trigger information, and at the same time start to count the second period, and send, when the second period ends, second adjustment trigger information, and at the same time restart to count the first period. Therefore, the third measurement module may specifically perform, after receiving the measurement command or second adjustment trigger information, based on the first measurement time parameters, inter-frequency cell measurement. The fourth measurement module may specifically perform, after receiving the first adjustment trigger information, based on second measurement time parameters, inter-frequency cell measurement.

Of course, the first period and second period may be controlled by the terminal, the specific duration of the period may be allocated by the terminal in advance, and may also be carried in the measurement command of the network side device.

The first period and second period alternately form a continuous time, and through the alternating first period and second period, inter-frequency cell measurement may be performed based on the time specified in different measurement time parameters.

The third measurement time parameters and the fourth measurement time parameters are different. Based on different time specifications of the measurement time parameters, when inter-frequency cell measurement is performed, the electrical consumption for measurement is different, so that the power consumption is also different.

The device may further include an identifier determination module, configured to determine whether the measurement command carries a measurement identifier, and if yes, trigger the third measurement module or fourth measurement module to start.

In this embodiment, the third measurement module and the fourth measurement module perform, within different periods, based on time specifications of different measurement time parameters, inter-frequency cell measurement, and different measurement time parameters specify different actual measurement time, so that inter-frequency cell measurement is not always performed based on one type of measurement time parameters. Therefore, the electrical consumption for measurement of the device may be reduced, thereby lowering the power consumption of the device, enhancing the performance of the device, and guaranteeing the probability that an inter-frequency cell that meets a measurement event is determined within a certain time, and the device is capable of enhancing, when being applied in the terminal, enhancing the performance of the terminal.

Figure 16:
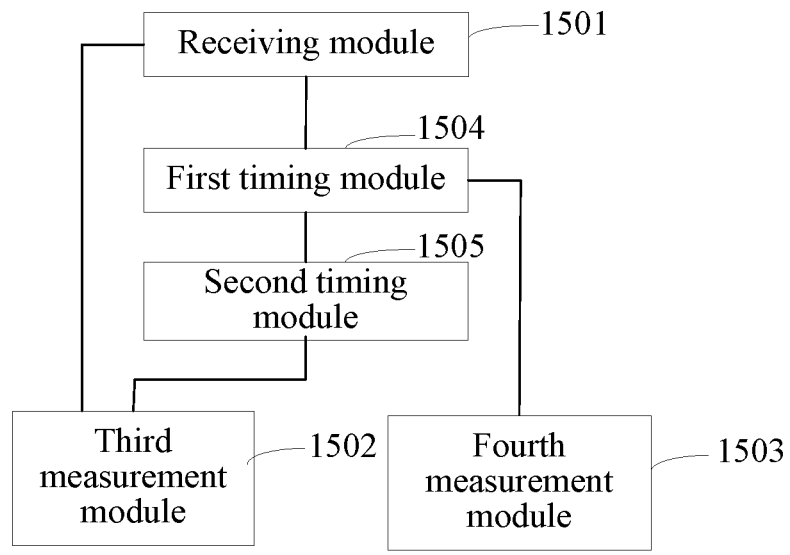
FIG. 16 is a schematic structural view of a device for inter-frequency cell measurement according to Embodiment 5 of the present invention.

FIG. 16 is a schematic structural view of a device for inter-frequency cell measurement according to Embodiment 5 of the present invention. The device may include a receiving module 1501, a third measurement module 1502 and a fourth measurement module 1503. For the functions of the modules, reference may be made to device Embodiment 4. The difference from device Embodiment 4 lies in that, the device in this embodiment further includes a first timing module 1504 and a second timing module 1505.

The first timing module 1504 is configured to provide a first period, and trigger, when the first period ends, the fourth measurement module 1503 and the second timing module 1505 to start.

The second timing module 1505 is configured to provide a second period, and trigger, when the second period ends, the third measurement module 1502 and the first timing module 1504 to start.

In practical applications, the first timing module and the second timing module may be specifically timers. The duration parameters set for the timers may be carried in the measurement command, and may also be preconfigured by the device.

The first timing module and the second timing module alternately start to implement the alternate first period and second period and form a continuous time.

The device may further include an identifier determination module, configured to determine whether the measurement command carries a measurement identifier, and if yes, trigger the third measurement module and the first timing module to start. The first timing module starts counting, and the third measurement module performs, within the counting period of the the first timing module, based on third measurement time parameters, inter-frequency cell measurement.

In this embodiment, alternatively, the third gap duration in the third measurement time parameters is greater than the fourth gap duration in the fourth measurement time parameters, and/or the third gap repetition cycle is smaller than the fourth gap repetition cycle, and/or the third minimum available measurement time is greater than the fourth minimum available measurement time. That is, the terminal may first perform, based on the third measurement time parameters that enable an inter-frequency cell that meets a measurement event to be determined more quickly, inter-frequency cell measurement, set the time length that the terminal performs, based on the third measurement time parameters, inter-frequency cell measurement, and perform, when the first period ends, based on the preset fourth measurement time parameters, inter-frequency cell measurement, or suspend measurement, so as to reduce the electrical consumption for measurement to a certain degree and lower the power consumption.

Figure 17:
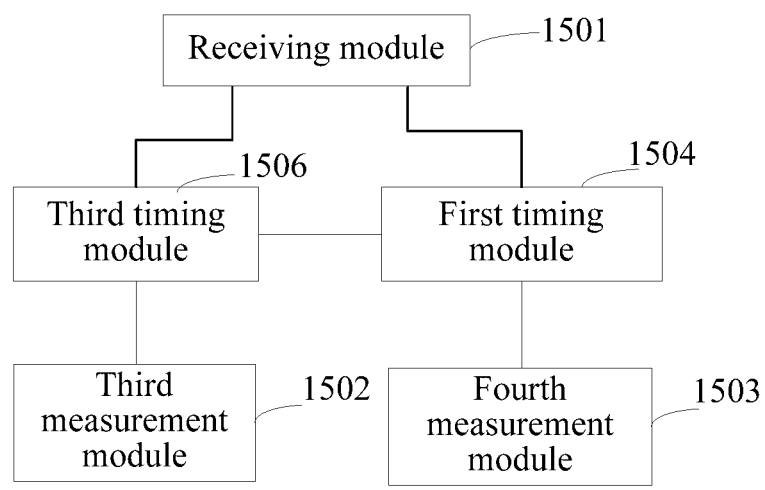
FIG. 17 is a schematic structural view of a device for inter-frequency cell measurement according to Embodiment 6 of the present invention.

FIG. 17 is a schematic structural view of a device for inter-frequency cell measurement according to Embodiment 6 of the present invention. The device may include a receiving module 1501, a third measurement module 1502 and a fourth measurement module 1503. For the functions of the modules, reference may be made to device Embodiment 4. The the difference from device Embodiment 4 lies in that, the device in this embodiment further includes a first timing module 1504 and a third timing module 1506.

The first timing module 1504 is configured to provide a first period, and trigger, when the first period ends, the fourth measurement module 1503 to start.

The third timing module 1506 is configured to provide the first period and a second period, and trigger, when the second period ends, the third measurement module 1502, the first timing module 1504, and the third timing module to start.

In practical applications the first timing module and the third timing module may be specifically timers, and the duration parameters set for the timers may be carried in the measurement command, and may also be preconfigured by the device.

The first timing module and the third timing module may start at the same time. The first timing module and the third timing module may start after receiving a trigger instruction of the first receiving module, and may also start after it is determined that the first receiving module has received the measurement command sent by the network side device, so as to provide the alternate first period and second period and form a continuous time.

The device may further include an identifier determination module, configured to determine whether the measurement command carries a measurement identifier, and if yes, trigger the third measurement module, the first timing module, and the second timing module to start.

In this embodiment, alternatively, the third gap duration in the third measurement time parameters is greater than the fourth gap duration in the fourth measurement time parameters, and/or the third gap repetition cycle is smaller than the fourth gap repetition cycle, and/or the third minimum available measurement time is greater than the fourth minimum available measurement time. That is, the third measurement module may first perform, based on the third measurement time parameters that enable an inter-frequency cell that meets a measurement event to be determined more quickly, inter-frequency cell measurement, set the time length that the terminal performs, based on the third measurement time parameters, inter-frequency cell measurement, and trigger, when the first period ends, the fourth measurement module to perform, based on the preset fourth measurement time parameters, inter-frequency cell measurement, or suspend measurement, so as to reduce the electrical consumption for measurement to a certain degree and lower the power consumption of the device.

Figure 18:
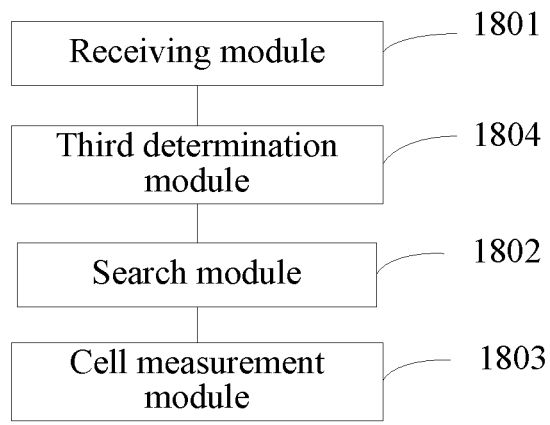
FIG. 18 is a schematic structural view of a device for inter-frequency cell measurement according to Embodiment 7 of the present invention.

FIG. 18 is a schematic structural view of a device for inter-frequency cell measurement according to Embodiment 7 of the present invention, in which the device may include:

A receiving module 1801 is configured to receive a measurement command carrying information about an inter-frequency band sent by a network side device.

A search module 1802 is configured to search for, according to a presaved mapping between measurement time parameters and information about an inter-frequency band, target measurement time parameters corresponding to the information about the inter-frequency band.

A cell measurement module 1803 is configured to perform, based on the target measurement time parameters, inter-frequency cell measurement.

The device may further include:

A third determination module 1804 is configured to determine whether the measurement command carries a measurement identifier, and if yes, trigger the search module 1802 to start.

The device may further include a sending module, configured to send a capability identifier to the network side device, and the network side device may determine, after receiving the capability identifier, that terminal has the capability of measuring in parallel cells at different inter-frequency bands based on different measurement time parameters, and then send to the terminal the measurement command carrying the measurement identifier.

In this embodiment, after the receiving module receives a measurement command carrying information about an inter-frequency band sent by a network side device, the search module first searches for target measurement time parameters corresponding to the information about the inter-frequency band according to a presaved mapping between measurement time parameters and information about an inter-frequency band, and triggers the cell measurement module to perform, based on the target measurement time parameters, inter-frequency cell measurement. Inter-frequency cell measurement is performed according to different information about an inter-frequency band based on different measurement time parameters, so as to determine more quickly a cell that meets a measurement event, and at the same time save the power consumption and enhance the performance of the device.

Figure 19:
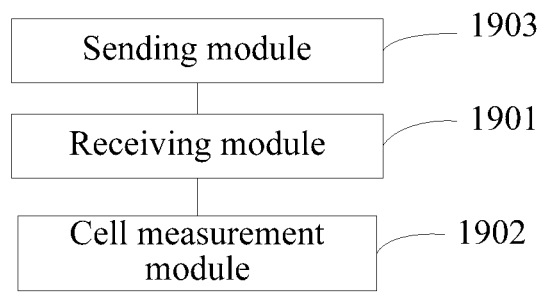
FIG. 19 is a schematic structural view of a device for inter-frequency cell measurement according to Embodiment 8 of the present invention.

FIG. 19 is a schematic structural view of a device for inter-frequency cell measurement according to Embodiment 8 of the present invention, in which the device may include:

A receiving module 1901 is configured to receive a measurement command carrying information about an inter-frequency band and corresponding target measurement time parameters thereof sent by a network side device, where the measurement command is sent after the network side device finds the target measurement time parameters corresponding to the information about the inter-frequency band according to a presaved mapping between measurement time parameters and information about an inter-frequency band.

A cell measurement module 1902 is configured to perform, based on the target measurement time parameters, inter-frequency cell measurement.

The device may further include:

A sending module 1903 is configured to send a capability identifier to the network side device, where the measurement command is specifically sent after the network side device receives the capability identifier and finds the target measurement time parameters corresponding to the information about the inter-frequency band according to a presaved mapping between measurement time parameters and information about an inter-frequency band.

It should be noted that, in the foregoing embodiments, reference may be made between the functions of same or similar modules, and therefore the descriptions in some embodiments are relatively simple.

The device for inter-frequency cell measurement of the present invention may be specifically integrated to a terminal, and therefore the present invention further provides a terminal, which includes the device for inter-frequency cell measurement.

Figure 20:
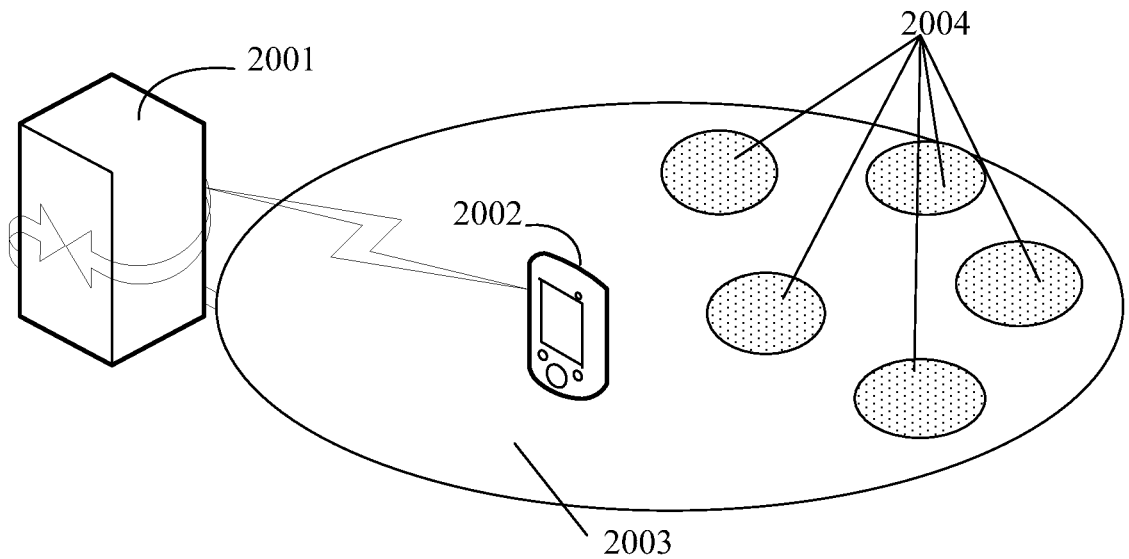
FIG. 20 is a schematic structural view of a system for inter-frequency cell measurement according to an embodiment of the present invention.

The present invention further provides a system for inter-frequency cell measurement. FIG. 20 is a schematic structural view of the system according to an embodiment. The system may include:

A network side device 2001 is configured to send to a terminal a measurement command carrying information about an inter-frequency band.

In practical applications, the network side device may be specifically equipment such as a small base station, a home base station, a relay station and a wireless local area network access point.

A terminal 2002 is configured to detect, after receiving the measurement command, whether a candidate cell is present within a certain range of a current position; if yes, perform, based on preset first measurement time parameters, inter-frequency cell measurement; and if no, perform, based on preset second measurement time parameters, inter-frequency cell measurement.

The first measurement time parameters include a first gap duration, a first gap repetition cycle, and a first minimum available measurement time, the second measurement time parameters include a second gap duration, a second gap repetition cycle, and a second minimum available measurement time, and the first gap duration is longer than the second gap duration, and/or the first gap repetition cycle is shorter than the second gap repetition cycle, and/or the first minimum available measurement time is longer than the second minimum available measurement time.

The terminal is currently located in the serving cell 2003, and inter-frequency cells 2004 whose carrier frequencies are different from that of the the serving cell 2003 are scattered in the serving cell 2003. When the network side device monitors that the network traffic volume of the serving cell of the terminal is high, or to enhance the effect of the inter-frequency cell in increasing the system capacity, in order to select a suitable inter-frequency cell to distribute the network service, the network side device commands the terminal to perform inter-frequency cell measurement and sends a measurement command to the terminal.

For the operations specifically performed by the terminal and the network side device, reference may be made to the foregoing embodiments, so no further details are provided here. For the schematic structural views of the terminal and the network side device, reference may be made to FIG. 20. The difference thereof from the foregoing embodiments only lies in that the specific functions implemented by the terminal and the network side device are different.

The terminal may specifically be a terminal that includes the device for inter-frequency cell measurement of Embodiment 1 or Embodiment 2.

Through the system for inter-frequency cell measurement in this embodiment, the inter-frequency cell measurement may be implemented, and at the same time the power consumption for measurement of the terminal is further saved, thereby enhancing the performance of the terminal.

In another embodiment, the present invention further provides a system for inter-frequency cell measurement, in which the system may include:

A network side device is configured to send to a terminal a measurement command carrying information about an inter-frequency band.

The terminal is configured to detect, after receiving the measurement command, whether the signal quality or strength of a serving cell is lower than a second preset value, where the second preset value is carried in the measurement command or prestored in the terminal; if yes, perform, based on preset first measurement time parameters, inter-frequency cell measurement; and if no, perform, based on preset second measurement time parameters, inter-frequency cell measurement.

The first measurement time parameters include a first gap duration, a first gap repetition cycle, and a first minimum available measurement time, the second measurement time parameters include a second gap duration, a second gap repetition cycle, and a second minimum available measurement time, and the first gap duration is longer than the second gap duration, and/or the first gap repetition cycle is shorter than the second gap repetition cycle, and/or the first minimum available measurement time is longer than the second minimum available measurement time.

The terminal may be specifically a terminal that includes the device for inter-frequency cell measurement in Embodiment 3. For the operations specifically performed by the terminal and the network side device, reference may be made to the foregoing embodiments, so no further details are provided here. For the schematic structural views of the terminal and the network side device, reference may be made to FIG. 20. The difference thereof from the foregoing embodiments only lies in that the specific functions implemented by the terminal and the network side device are different.

Through the system for inter-frequency cell measurement in this embodiment, inter-frequency cell measurement may be implemented, and at the same time the power consumption for measurement of the terminal is further saved, thereby enhancing the performance of the terminal.

In still another embodiment, the present invention further provides a system for inter-frequency cell measurement, in which the system may include:

A network side device is configured to send to a terminal a measurement command carrying information about an inter-frequency band.

The terminal is configured to perform, after receiving the measurement command, within a first period, based on preset third measurement time parameters, inter-frequency cell measurement; and perform, within a second period, based on preset fourth measurement time parameters, inter-frequency cell measurement or suspend inter-frequency cell measurement, where the first period and the second period alternately form a continuous time, and the third measurement time parameters are different from the fourth measurement time parameters.

The terminal may be specifically terminal that includes the device for inter-frequency cell measurement in Embodiment 4, Embodiment 5 or Embodiment 6. For the operations specifically performed by the terminal and the network side device, reference may be made to the foregoing embodiments, so no further details are provided here. For the schematic structural views of the terminal and the network side device, reference may be made to FIG. 20. The difference thereof from the foregoing embodiments only lies in that the specific functions implemented by the terminal and the network side device are different.

Through the system for inter-frequency cell measurement in this embodiment, inter-frequency cell measurement may be implemented, and at the same time the power consumption for measurement of the terminal is further saved, thereby enhancing the performance of the terminal.

In still another embodiment, the present invention further provides a system for inter-frequency cell measurement, in which the system may include:

A network side device is configured to send to a terminal a measurement command carrying information about an inter-frequency band.

The terminal is configured to search for, after receiving the measurement command, according to a presaved mapping between measurement time parameters and information about an inter-frequency band, target measurement time parameters corresponding to the information about the inter-frequency band; where the terminal performs, based on the target measurement time parameters, inter-frequency cell measurement.

The terminal may be specifically a terminal that includes the device for inter-frequency cell measurement in Embodiment 7. For the operations specifically performed by the terminal and the network side device, reference may be made to the foregoing embodiments, so no further details are provided here. For the schematic structural views of the terminal and the network side device, reference may be made to FIG. 20. The difference thereof from the foregoing embodiments only lies in that the specific functions implemented by the terminal and the network side device are different.

In still another embodiment, the present invention further provides a system for inter-frequency cell measurement, in which the system may include:

A network side device is configured to search for, according to a presaved mapping between measurement time parameters and information about an inter-frequency band, target measurement time parameters corresponding to information about an inter-frequency band; and send to a terminal a measurement command carrying the information about the inter-frequency band and the corresponding target measurement time parameters thereof.

The terminal is configured to perform, after receiving the measurement command, based on the target measurement time parameters, inter-frequency cell measurement.

The terminal may be specifically a terminal that includes the device for inter-frequency cell measurement in Embodiment 8. The operations specifically performed by the terminal and the network side device may be referred to the foregoing embodiments, so no further details are provided here. For the schematic structural views of the terminal and the network side device, reference may be made to FIG. 20. The difference thereof from the foregoing embodiments only lies in that the specific functions implemented by the terminal and the network side device are different.

All embodiments describe the present invention by using the progressive method. Each embodiment describes only the difference from other embodiments. For the similar parts among all embodiments, reference may be made to the relevant parts. The apparatus disclosed in the embodiment is related to the method disclosed in the embodiments, and is therefore outlined. For the associated part, reference may be made to the description in the method embodiments.

It should be noted that the relational terms herein such as first and second are used only to differentiate an entity or operation from another entity or operation, and do not require or imply any actual relationship or sequence between these entities or operations. Moreover, the terms "include", "comprise", and any variation thereof are intended to cover a non-exclusive inclusion". Therefore, in the context of a process, method, object, or device that includes a series of elements, the process, method, object, or device not only includes such elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

Based on the description of the disclosed embodiments, persons of the ordinary skill in the art can implement or apply the present invention. Various modifications of the embodiments are apparent to persons of ordinary skill in the art, and general principles defined in the specification can be implemented in other embodiments without departing from the spirit or scope of the present invention. Therefore, the present invention is not limited to the embodiments in the specification, but intends to cover the most extensive scope consistent with the principle and the novel features disclosed in the specification.

What is claimed is:

1. A method, performed by a terminal, for inter-frequency cell measurement, the method comprising:
   receiving a measurement command carrying information about an inter-frequency band from a network side device;
   determining that the measurement command carries a measurement identifier;
   starting, in response to the determining, a first timer configured to provide a first period;
   performing, within the first period and based on a preset measurement time parameter, an inter-frequency cell measurement;
   starting, in response to an expiring of the first period of the first timer, a second timer configured to provide a second period, wherein the first period differs from the second period, and wherein the first period and the second period alternately form a continuous time;
   suspending, within the second period, the inter-frequency cell measurement; and
   returning, in response to an expiring of the second period of the second timer, to the starting the first timer, and continuing the performing, based on the preset measurement time parameter, the inter-frequency cell measurement.

2. The method according to claim 1, wherein the first period and the second period are obtained from the network side device.

3. A device, comprising:
   a receiver;
   a processor; and
   a non-transitory computer readable medium comprising computer-executable instructions that, when executed by the processor, facilitate the device performing a method comprising:
   receiving, by the receiver cooperatively operating with the processor, a measurement command carrying information about an inter-frequency band from a network side device;
   determining that the measurement command carries a measurement identifier:
   starting, by the processor in response to the determining, a first timer configured to provide a first period;
   performing, within the first period and based on a preset measurement time parameter, an inter-frequency cell measurement;
   starting, in response to an expiring of the first period of the first timer, a second timer configured to provide a second period, wherein the first period differs from the second period, and wherein the first period and the second period alternately form a continuous time;
   suspending, within the second period, the inter-frequency cell measurement; and
   returning, in accodance with an expiring of the second period of the second timer, to the starting the first timer, and continuing the performing, based on the preset measurement time parameter, the inter-frequency cell measurement.

4. The device according to claim 3, wherein the first period and the second period are obtained by the device from the network side device.

5. A non-transitory computer-readable storage medium having programming instructions stored thereon which, when executed by a processor, cause the processor to perform, on a device containing a receiver, operations comprising:

receiving, by the receiver cooperatively operating with the processor, a measurement command carrying information about an inter-frequency band from a network side device;

determining that the measurement command carries a measurement identifier; starting a first timer configured to provide a first period;

performing, within the first period and based on a preset measurement time parameter, an inter-frequency cell measurement;

starting, in response to an expiring of the first period of the first timer, a second timer configured to provide a second period, wherein the first period differs from the second period, and wherein the first period and the second period alternately form a continuous time;

suspending within the second period, the inter-frequency cell measurement; and returning, in response to an expiring of the second period of the second timer, to the starting the first timer, and continuing the performing, based on the preset measurement time parameter, the inter-frequency cell measurement.

6. The non-transitory computer-readable storage medium according to claim 5, wherein the programming instructions further cause the processor to receive the first period and the second period from the network side device by the receiver.

* * * * *